(12) United States Patent
Takizawa et al.

(10) Patent No.: US 11,726,454 B2
(45) Date of Patent: Aug. 15, 2023

(54) INFORMATION COLLECTION SYSTEM, INFORMATION COLLECTION METHOD, AND PROGRAM

(71) Applicant: KABUSHIKI KAISHA YASKAWA DENKI, Kitakyushu (JP)

(72) Inventors: Takuya Takizawa, Kitakyushu (JP); Takeshi Nagata, Kitakyushu (JP); Takaaki Shogaki, Kitakyushu (JP)

(73) Assignee: KABUSHIKI KAISHA YASKAWA DENKI, Kitakyushu (JP)

(*) Notice: Subject to any disclaimer, the term of this patent is extended or adjusted under 35 U.S.C. 154(b) by 0 days.

(21) Appl. No.: 17/647,864

(22) Filed: Jan. 13, 2022

(65) Prior Publication Data

US 2022/0236718 A1 Jul. 28, 2022

(30) Foreign Application Priority Data

Jan. 22, 2021 (JP) ................................ 2021-008894

(51) Int. Cl.
*G05B 19/4155* (2006.01)

(52) U.S. Cl.
CPC .............. *G05B 19/4155* (2013.01); *G05B 2219/31449* (2013.01)

(58) Field of Classification Search
None
See application file for complete search history.

(56) References Cited

U.S. PATENT DOCUMENTS

| 2021/0103274 A1* | 4/2021 | Klenk | ............... G05B 19/4183 |
| 2021/0157301 A1 | 5/2021 | Nagata | |
| 2022/0129801 A1* | 4/2022 | Saito | ............... G05B 19/41865 |

FOREIGN PATENT DOCUMENTS

| JP | 2006-217549 A | 8/2006 |
| JP | 2013-257726 A | 12/2013 |
| JP | 6741923 B1 | 8/2020 |
| JP | 6761158 B | 9/2020 |

OTHER PUBLICATIONS

Office Action dated Feb. 8, 2022 in corresponding Japanese Patent Application No. 2021-008894 (with English-language Translation), 8 pages.

* cited by examiner

*Primary Examiner* — Ryan A Jarrett
(74) *Attorney, Agent, or Firm* — Oblon, McClelland, Maier & Neustadt, L.L.P.

(57) ABSTRACT

An information collection system for industrial machines includes processing circuitry that communicates with one or more industrial machines that execute one or more predetermined processes with respect to an object, identify, based on predetermined information received from the one or more industrial machines, the one or more predetermined processes executed with respect to the object, and assigns process identification information related to the one or more predetermined processes to collected information related to the object collected from the one or more industrial machines.

19 Claims, 18 Drawing Sheets

FIG. 5

| Execution order | Process | Industrial machine |
|---|---|---|
| 1 | p1 | 20A |
| 2 | p2 | 20B |
| 3 | p3 or p4 | 20C |
| 4 | p5 | 20D |
| 5 | p6 | 20E |

| Object data | | |
|---|---|---|
| System side object ID | Process ID | Collected information |
| 2101150001 | 0X00000001 | Collected information of process p1 |
|  | 0X00010002 | Collected information of process p2 |
|  | 0X00020003 | Collected information of process p3 |
|  | 0X00030004 | Collected information of process p5 |
|  | 0X0004FFFF | Collected information of process p6 |
| 2101150002 | 0X00000005 | Collected information of process p1 |
|  | 0X00050006 | Collected information of process p2 |
|  | 0X00060007 | Collected information of process p4 |
|  | 0X00070008 | Collected information of process p5 |
|  | 0X0008FFFF | Collected information of process p6 |
| 2101150003 | 0X00000009 | Collected information of process p1 |
|  | 0X00090010 | Collected information of process p2 |
|  | 0X00100011 | Collected information of process p3 |
|  | 0X00110012 | Collected information of process p5 |
|  | 0X0012FFFF | Collected information of process p6 |
| ⋮ | ⋮ | ⋮ |

INFORMATION COLLECTION SYSTEM, INFORMATION COLLECTION METHOD, AND PROGRAM

CROSS-REFERENCE TO RELATED APPLICATIONS

The present application is based upon and claims the benefit of priority to Japanese Patent Application No. 2021-008894, filed Jan. 22, 2021, the entire contents of which are incorporated herein by reference.

BACKGROUND OF THE INVENTION

Field of the Invention

The present invention relates to an information collection system, an information collection method, and a program.

Description of Background Art

Japanese Patent No. 6741923 describes an information collection system of industrial machines, in which when multiple industrial machines that executed predetermined processes with respect to an object are controlled, information of one or more processes executed by the multiple industrial machines until one product is manufactured is collected, and multiple process IDs that respectively correspond to multiple processes related to one product are assigned to and associated with the collected multiple sets of information. The entire contents of this publication are incorporated herein by reference.

SUMMARY OF THE INVENTION

According to one aspect of the present invention, an information collection system for industrial machines includes processing circuitry that communicates with one or more industrial machines that execute one or more predetermined processes with respect to an object, identify, based on predetermined information received from the one or more industrial machines, the one or more predetermined processes executed with respect to the object, and assigns process identification information related to the one or more predetermined processes to collected information related to the object collected from the one or more industrial machines.

According to another aspect of the present invention, an information collection method includes communicating with one or more industrial machines that execute one or more predetermined processes with respect to an object, identifying the one or more predetermined processes executed with respect to the object based on predetermined information received from the one or more industrial machines, and assigning process identification information related to the one or more predetermined processes to collected information related to the object collected from the one or more industrial machines.

According to yet another aspect of the present invention, a non-transitory computer readable medium has stored thereon a program that when executed by a computer causes the computer to implement an information collection method including communicating with one or more industrial machines that execute one or more predetermined processes with respect to an object, identifying the one or more predetermined processes executed with respect to the object based on predetermined information received from the one or more industrial machines, and assigning process identification information related to the one or more predetermined processes to collected information related to the object collected from the one or more industrial machines.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 illustrates a data storage example of process management data;

FIG. 6 illustrates a data storage example of an object database;

DETAILED DESCRIPTION OF THE EMBODIMENTS

Figure 1:
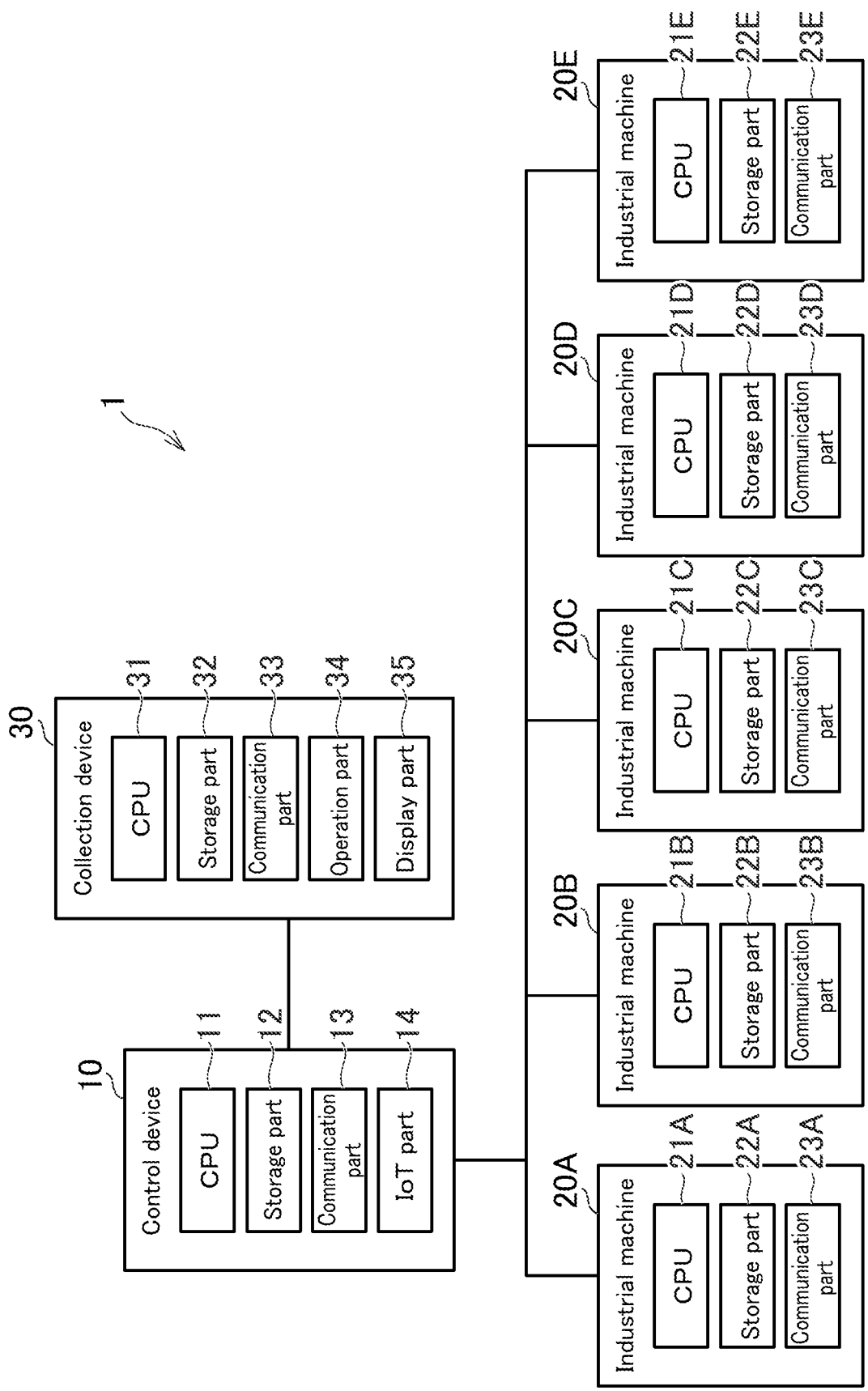
FIG. 1 illustrates an example of an overall structure of an information collection system.

Embodiments will now be described with reference to the accompanying drawings, wherein like reference numerals designate corresponding or identical elements throughout the various drawings.

1. First Embodiment

An example of an information collection system according to a first embodiment of the present invention is described.

1-1. Overall Structure of Information Collection System

FIG. 1 illustrates an example of an overall structure of the information collection system. As illustrated in FIG. 1, an information collection system 1 includes a control device 10, industrial machines (20A-20E), and a collection device 30. The devices are communicably connected to each other by a general network such as an Ethernet (registered trademark) or by an industrial network (so-called field network). When the industrial machines (20A-20E) are not distinguished from each other, the last alphabet is omitted and the industrial machines (20A-20E) are each simply described as an industrial machine 20. In FIG. 1, CPUs (21A-21E), storage parts (22A-22E), and communication parts (23A-23E) are described. However, in the following description, since these are not distinguished, the last alphabet is omitted and they are each simply referred to as a CPU 21, a storage part 22, or a communication part 23.

The control device 10 is a device that controls one or more industrial machines 20. The term "control" here means not only instructing an industrial machine 20 to start a process, but also includes giving only other minimal instructions to an industrial machine 20 without, in principle, instructing to start a process. That an industrial machine 20 performs a certain operation based on a certain instruction from the control device 10 may correspond to "control." FIG. 1 illustrates a case where the control device 10 controls five industrial machines 20. However, the control device 10 can control any number of industrial machines 20. The control device 10 may control 1-4 or 6 or more industrial machines 20. When the entire information collection system 1 is referred to as a cell, the control device 10 may be referred to as a cell controller. The control device 10 may be a device having another name such as a PLC (Programmable Logic Controller).

The control device 10 includes a CPU 11, a storage part 12, a communication part 13, and an IoT part 14. The CPU 11 includes at least one processor. The CPU 11 is a type of circuitry. The storage part 12 includes at least one of a volatile memory and a non-volatile memory. The communication part 13 includes at least one of a communication interface for wired communication and a communication interface for wireless communication. The IoT part 14 is hardware that transmits data to other computers via a network. For example, the IoT part 14 includes a CPU, a storage part, and a communication part. Physical structures of the CPU, the storage part, and the communication part included in the IoT part 14 may be respectively the same as those of the CPU 11, the storage part 12, and the communication part 13. For example, integrity of information about variables and the like may be periodically or non-periodically maintained between the CPU 11 and the IoT part 14. When the CPU 11 has an information collection function, the IoT part 14 may be omitted.

An industrial machine 20 is a general term for a device that assists or acts on behalf of human work and its peripheral devices. The industrial machines 20 may be referred to as equipment. A collection of multiple industrial machines 20 may be referred to as a line or cell. For example, the industrial machines 20 are each a PLC, a robot controller, an industrial robot, a motor controller, a servo amplifier, a motion controller, a numerical control device, a winding machine, a power converter, an inspection device, or a measuring device. The industrial machines 20 each include a CPU 21, a storage part 22, and a communication part 23. Physical structures of the CPU 21, the storage part 22, and the communication part 23 may be respectively the same as those of the CPU 11, the storage part 12, and the communication part 13.

The collection device 30 is a device that collects information. The term "collect" here has the same meaning as "receive" or "acquire." For example, the collection device 30 is a personal computer, a server computer, a tablet terminal, or a smartphone. The collection device 30 includes a CPU 31, a storage part 32, a communication part 33, an operation part 34, and a display part 35. Physical structures of the CPU 31, the storage part 32, and the communication part 33 may be respectively the same as those of the CPU 11, the storage part 12, and the communication part 13. The operation part 34 is an input device such as a mouse or a keyboard. The display part 35 is a liquid crystal display or an organic EL display.

Programs and data stored in the storage parts (12, 22, 32) may be supplied via a network. Further, the hardware structures of the devices are not limited to those of the above examples, and various hardware structures can be adopted. For example, a reading part (such as a memory card slot) that reads a computer-readable information storage medium or an input-output part (such as a USB terminal) for connecting to an external device may be included. In this case, a program or data stored in the information storage medium may be supplied via the reading part or the input-output part. In addition, for example, a circuit referred to as an FPGA or an ASIC may be included.

1-2. Overview of Information Collection System

In the information collection system 1, multiple processes are executed in a predetermined order with respect to each of multiple objects. The objects are each an object of a work. The objects are also each referred to as a workpiece. The objects may each be any of a final product, an intermediate product, a material, or a raw material. The objects may each be of any type, for example, may each be a semiconductor, an electrical appliance, an automobile, a food, a beverage, a pharmaceutical, or a daily necessity. The processes are each a work with respect to an object, and are each, for example, processing, assembling, carrying, gripping, measuring, or inspecting. The processes can be said to be operations of the industrial machines 20.

In the first embodiment, the control device 10 periodically or non-periodically acquires information from the industrial machines 20, and gives minimal instructions to the industrial machines 20. The industrial machines 20 individually operate to execute the processes even without receiving a particular instruction from the control device 10. The industrial machines 20 store process programs in which operations of the processes are defined. Each of the industrial machines 20 determines whether or not an execution condition of a process is satisfied, and when the execution condition is satisfied, executes a process program to start the process.

The execution condition may be any condition, for example, may be that predetermined information is received from another industrial machine 20, that a predetermined signal is received from a sensor connected to the industrial machine 20 itself, that a variable stored in the industrial machine 20 has reached a predetermined value, or a combination of these. A sensor connected to an industrial machine 20 may be of any type, for example, may be a vision sensor, a torque sensor, a motor encoder, an object detection sensor, a temperature sensor, or a grip sensor.

Figure 2:
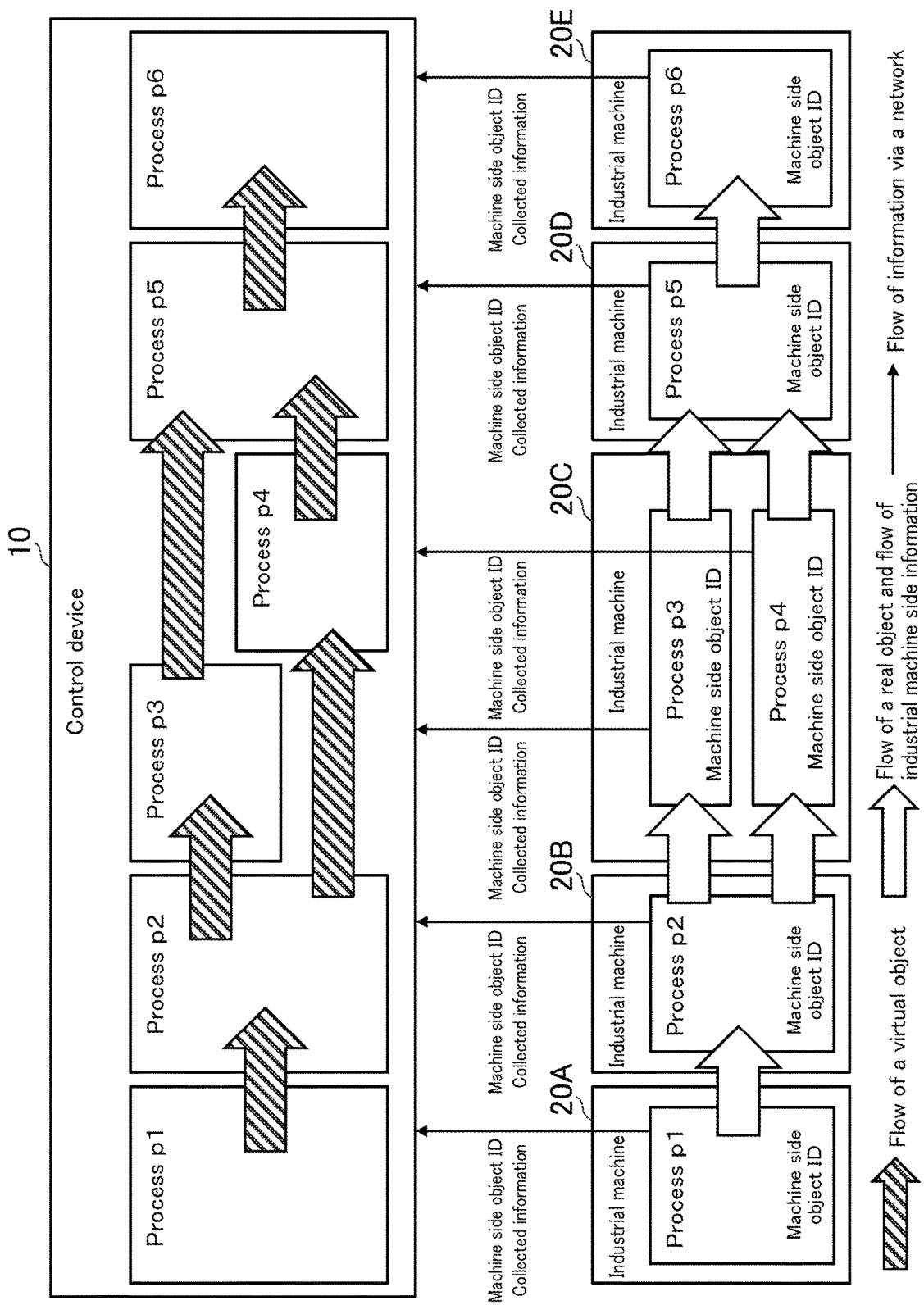
FIG. 2 illustrates an example of flows of an object and information in a first embodiment.

FIG. 2 illustrates an example of flows of an object and information in the first embodiment. Shaded arrows in FIG. 2 indicate a flow of a virtual object. A virtual object is an object managed by the control device 10 as internal information. White arrows indicate a flow of a real object and a flow of industrial machine 20 side information. That is, the white arrows indicate physical movements of an object in the line or cell and a flow of information over the network connecting the industrial machines 20. Solid-line arrows indicate a flow of information via a network connecting the control device 10 and the industrial machines 20.

In the first embodiment, as process routes that an object follows, there are a route in which a process (p1), a process (p2), a process (p3), a process (p5), and a process (p6) are executed in this order and a route in which the process (p1), the process (p2), a process (p4), the process (p5), and the process (p6) are executed in this order. That is, a process branching occurs after the process (p2). The process (p1) is executed by the industrial machine (20A). The process (p2) is executed by the industrial machine (20B). The process (p3) and the process (p4) are executed by the industrial machine (20C). The process (p5) is executed by the industrial machine (20D). The process (p6) is executed by the industrial machine (20E).

For example, when the industrial machine (20A) executes the process (p1) of a certain object, the industrial machine (20A) generates a machine side object ID that uniquely identifies the object on the industrial machine 20 side. The industrial machine (20A) transmits the machine side object ID and collected information of the object to the control device 10 and transmits the machine side object ID to the industrial machine (20B). The machine side object ID may be generated before the execution of the process (p1).

The collected information is information collected for ensuring traceability of the object. For example, the collected information includes a physical quantity detected by a sensor, a process start date and time, a process end date and time, a date and time when intermediate processing is executed, presence or absence of an alarm, an alarm type, a measurement result of the object, an image or a video of the object, measurement results of the object, a parameter during process execution, firmware information during process execution, or a combination of these. Items included in the collected information may be common to all the industrial machines 20 or may be determined according to the industrial machines 20. The machine side object ID and the collected information may be transmitted during the execution of the process, rather than being transmitted when the process is completed. Machine side object IDs and collected information of multiple processes may be transmitted together all at once.

When the process (p1) is completed, the object is moved to a work area of the industrial machine (20B) by using a carrying device such as a belt conveyor. After that, in the same manner, the object is moved to work areas of the industrial machines (20C-20E) and the processes are executed. When the industrial machines (20B-20E) execute the processes (p2-p6), similar to the industrial machine (20A), the industrial machines (20B-20E) transmit the machine side object ID and the collected information to the control device 10. Since the industrial machine (20C) executes either the process (p3) or the process (p4) with respect to a certain object, the industrial machine (20C) also transmits information identifying the process executed with respect to the object.

Each time a process is executed with respect to a certain object, the control device 10 receives a machine side object ID and collected information of the object. In the first embodiment, it is assumed that the control device 10 knows a rough process flow in the cell in advance. Therefore, when a machine side object ID and collected information are received from an industrial machine 20, the control device 10 can identify which process has been executed with respect to which object. However, since branching occurs after the process (p2), with respect to the process (p3) or the process (p4), the control device 10 determines the executed process based on the information received from the industrial machine (20C).

Upon receiving a machine side object ID and collected information of a certain object, the control device 10 generates a process ID that uniquely identifies a process executed with respect to the object. When the process (p6) of a certain object is completed, the control device 10 generates a system side object ID that uniquely identifies the object on the control device 10 side. The system side object ID and the process IDs of each object are assigned to the collected information of the object. The system side object ID may be generated before the process (p6) is completed.

Figure 3:
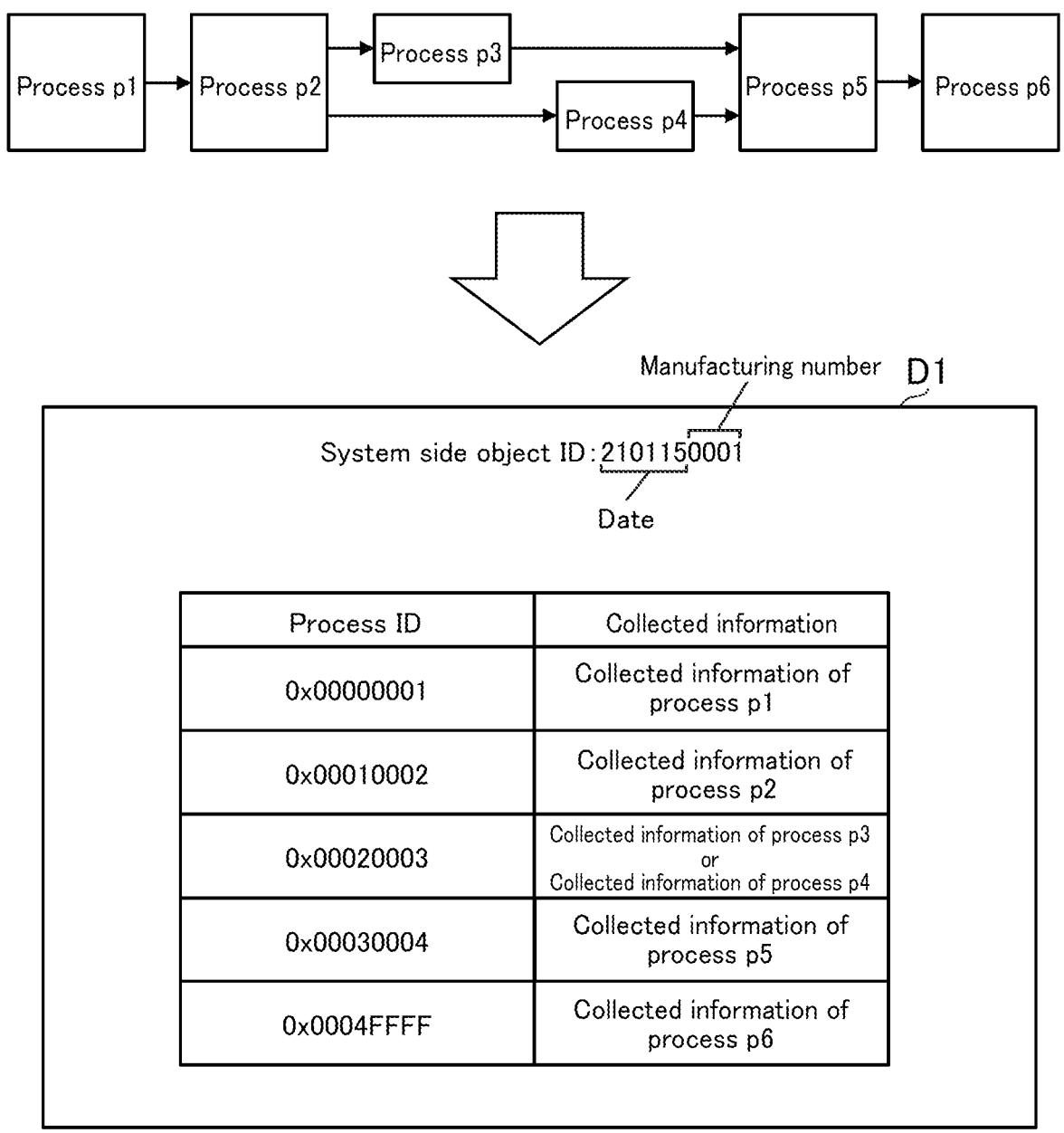
FIG. 3 illustrates an example of collected information to which a system side object ID and process IDs are assigned.

FIG. 3 illustrates an example of the collected information to which the system side object ID and the process IDs are assigned. In the first embodiment, a collection of a system side object ID, process IDs, and collected information is described as object data (D1). Object data (D1) is generated for each object. Object data (D1) may also be generated for an object that is lined out during processing without completing the process (p6). Since multiple objects can be assembled and finally one object is obtained, in this case, one set of object data (D1) is generated with respect to the one finally assembled object.

In the example of FIG. 3, the system side object ID includes a 6-digit numerical number indicating a date and a 4-digit numerical number indicating a manufacturing number. The date and the manufacturing number may each have any number of digits and are not limited to the example of FIG. 3. When a system side object ID is "2101150001," the first 6 digits "210115" mean Jan. 15, 2021, and the last 4 digits "0001" indicate a manufacturing number that identifies an object manufactured on that date. For example, the manufacturing number is initialized once each day, and is incremented by one each time all the processes with respect to an object have been completed. When the initial value of the manufacturing number is 1, it means that the object illustrated in FIG. 3 is the first object manufactured on Jan. 15, 2021.

In the example of FIG. 3, the process IDs each contain a fixed value "0x" followed by an 8-digit numerical number. The process IDs may each have any number of digits and are not limited to the example of FIG. 3. The first 4 digits of the 8-digit numerical number in the process ID of a certain process are the last 4 digits of the 8-digit numerical number in the process ID of a pre-process of the process. The last 4 digits of the 8-digit number in the process ID of a certain process are the first 4 digits of the 8-digit number in the process ID of a post-process of the process. By including an 8-digit numerical number in the process ID of each process, a pre-process and a post-process of the process can be associated with each other.

Since the process (p1) is the first process and does not have a pre-process, the first 4 digits of the 8-digit numerical number are a fixed value "0000" indicating that it is the first process. Since the process (p6) is the last process and does not have a post-process, the last 4 digits of the 8-digit numerical number are a fixed value "FFFF" indicating that it is the last process. These fixed values are examples and may be any values.

When all the processes with respect to a certain object are completed, the control device 10 generates object data (D1) corresponding to the object and transmits the object data (D1) to the collection device 30. The control device 10 generates object data (D1) for each object for which all the processes have been completed and transmits the object data (D1) to the collection device 30 until all the processes for all objects on a certain day are completed. It is also possible that object data (D1) sets of multiple objects are accumulated, and are transmitted together all at once.

As described above, in the information collection system 1, the control device 10 receives a machine side object ID and collected information from the industrial machines 20, and thereby, even when the control device 10 does not directly control the industrial machines 20, object data (D1) in which a system side object ID and process IDs are assigned to the collected information is generated and traceability of an object is ensured. In the following, details of this structure are described.

1-3. Functions Realized by Information Collection System

Figure 4:
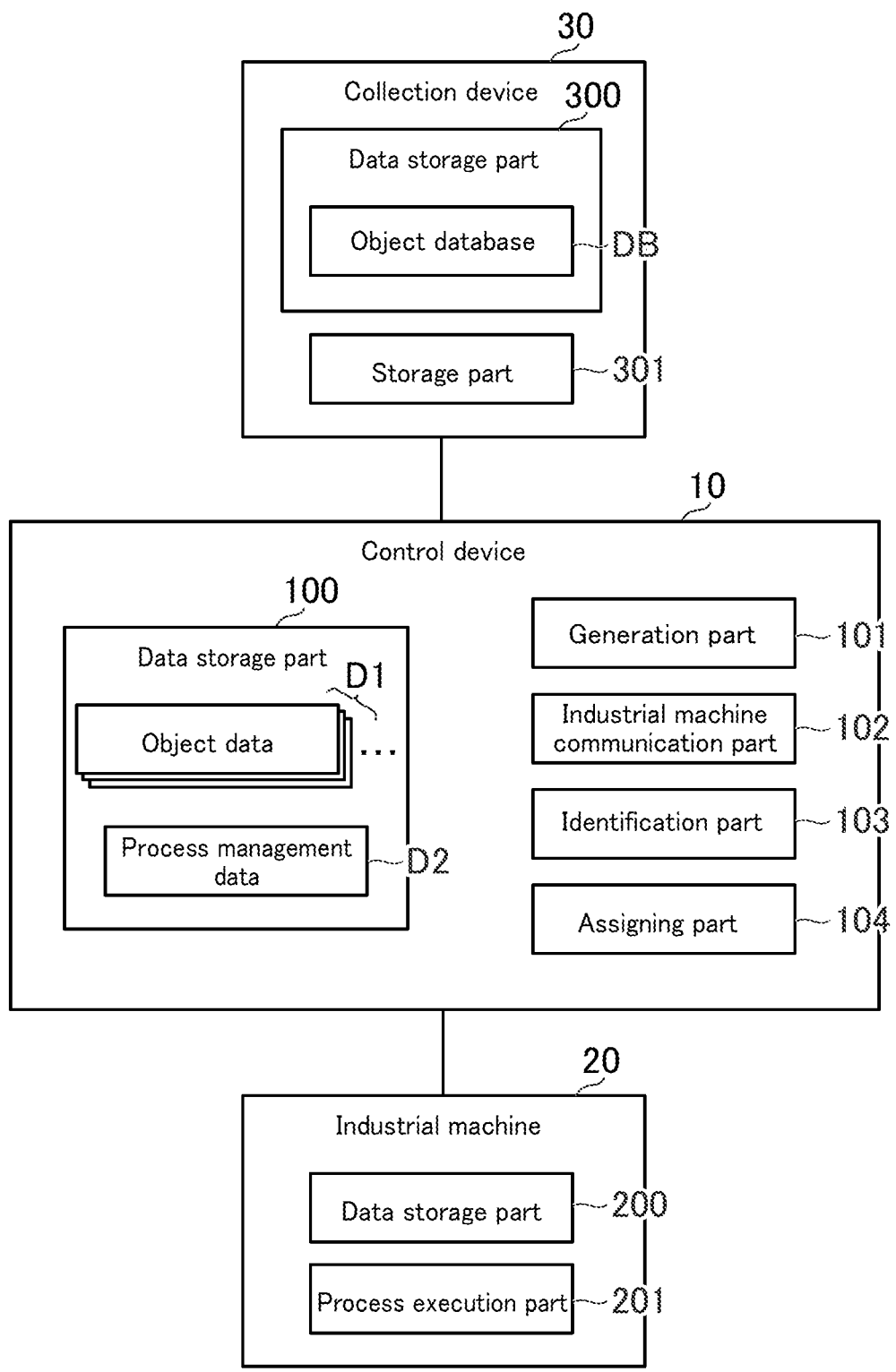
FIG. 4 is a functional block diagram illustrating functions realized by an information collection system of the first embodiment.

FIG. 4 is a functional block diagram illustrating functions realized by the information collection system 1 of the first embodiment. In the present embodiment, functions realized by the control device 10, the industrial machines 20, and the collection device 30 are described.

1-3-1. Functions Realized by Control Device

As illustrated in FIG. 4, in the control device 10, a data storage part 100, a generation part 101, an industrial machine communication part 102, an identification part 103, and an assigning part 104 are realized. The data storage part 100 is mainly realized by at least one of the storage part 12 and the IoT part 14, and the other functions are mainly realized by at least one of the CPU 11 and the IoT part 14.

Data Storage Part

The data storage part 100 stores data required for collecting collected information. For example, the data storage part 100 stores object data (D1) and process management data (D2). A data storage example of object data (D1) is as illustrated in FIG. 3. The data storage part 100 stores object data (D1) of multiple objects.

FIG. 5 illustrates a data storage example of process management data (D2). As illustrated in FIG. 5, the process management data (D2) is data related to basic information of the processes executed in the information collection system 1. For example, the process management data (D2) includes an execution order of the processes, names of the processes, and names of the industrial machines 20. When a user specifies an execution order of the processes, and the like, using an engineering tool, process management data (D2) is generated and is recorded in the data storage part 100. The process management data (D2) may be included as a part of a control program.

Each process may be identified by other information such as a number or an ID rather than a name of the process. Similarly, each individual industrial machine 20 may be identified by other information such as an ID or an IP address rather than a name of the industrial machine 20. The process management data (D2) may include information for identifying the processes to be executed with respect to each object and an order of the processes, and the industrial machines 20, which are entities that execute the processes.

The data stored by the data storage part 100 is not limited to the above example. For example, the data storage part 100 may store a dataset of a machine side object ID and collected information received from an industrial machine 20 as intermediate data for generating object data (D1). In the first embodiment, since five processes are executed with respect to each object, there are five sets of collected information for each object. A machine side object ID is used to group five sets of collected information corresponding to a certain object. In the example of FIG. 3, it is assumed that a machine side object ID is not included in object data (D1). However, a machine side object ID may be included in object data (D1).

Further, for example, the data storage part 100 may store a control program for the control device 10 to give predetermined instructions to the industrial machines 20. In the first embodiment, since the industrial machines 20 individually execute the processes, no code for instructing to start a process is written in the control program. However, when the control device 10 controls the processes of the industrial machines 20, execution conditions and the like of the processes are defined in the control program. The control program can be created in any language such as a ladder language or a robot language.

Generation Part

The generation part 101 generates a system side object ID that is different from a machine side object ID generated on one or more industrial machines 20 side. A machine side object ID is information for independently managing an object on the industrial machine 20 side. A system side object ID is information for independently managing an object on the control device 10 side. The machine side object ID and the system side object ID are each an example of object identification information. Therefore, a part described as a machine side object ID or a system side object ID can be read as object identification information. The generation part 101 generates object identification information of an object.

Object identification information is information that can identify an object. Object identification information may be information that can uniquely identify an individual object within an entire period, or information that can uniquely identify an individual object within a certain part of a period. Object identification information may be other information such as a number or a name instead of an ID. Object identification information may be in any form, for example, may be expressed by a number, a letter, or a combination of these. Object identification information may be generated according to any rule, and this rule is not limited to the example of the first embodiment.

In the first embodiment, the case is described where the object identification information on the control device 10 side and the object identification information on the industrial machine 20 side are different from each other. However, these may be the same. That is, common object identification information may be used between the control device 10 and the industrial machines 20. In this case, the common object identification information may be generated by either the control device 10 or the industrial machines 20, or may be generated by another device. In addition, for example, on the industrial machine 20 side, it is also possible that the object identification information is not used in particular.

For example, the generation part 101 acquires a current date and time using a real-time clock or the like, and acquires the first 6-digit numerical number (date) of a system side object ID. The generation part 101 generates a system side object ID by combining the acquired first 6-digit numerical number with a 4-digit numerical number that is an initial manufacturing number or an incremented manufacturing number. When all the processes of a certain object are completed, the generation part 101 generates a system side object ID of the object. Each time a system side object ID is generated, the generation part 101 increments the manufacturing number. When all the processes of all the objects on a certain day are completed, the generation part 101 returns the manufacturing number to its initial value.

The system side object ID can be generated at any timing, and is not limited to the timing after all the processes are completed. For example, the generation part 101 may generate a system side object ID of a certain object before starting the first process of the object. Further, for example, the generation part 101 may generate a system side object ID between the start of the first process and the completion of the last process of a certain object. Further, for example, the generation part 101 may generate system side object IDs of multiple objects at once.

Industrial Machine Communication Part

The industrial machine communication part 102 communicates with one or more industrial machines 20 that execute predetermined processes with respect to an object. Any method can be used for the communication between the control device 10 and the industrial machines 20. For example, it may be synchronous communication or asynchronous communication. Further, for example, it may be constant-period communication or non-constant-period communication. It is also possible that the industrial machine communication part 102 communicates only with some industrial machines 20 instead of communicating with all the industrial machines 20.

The industrial machine communication part 102 can transmit any data to the industrial machines 20. For example, the industrial machine communication part 102 transmits an instruction for executing a predetermined operation to the industrial machines 20. In the first embodiment, since the control device 10 does not actively control the processes, this instruction is not an instruction for executing a process, but an instruction for minimal control. This instruction may be of any content, for example, may be power on/off, failure recovery, parameter change, firmware update, or setting of a collection condition of collected information, or the like.

The industrial machine communication part 102 can receive any data from the industrial machines 20. For example, the industrial machine communication part 102 receives a response to an instruction transmitted to the industrial machines 20. In the first embodiment, since the industrial machines 20 each spontaneously execute a process and transmit a machine side object ID and collected information to the control device 10, the industrial machine communication part 102 receives the machine side object ID and the collected information at a timing when an industrial machines 20 completes a process or at a timing before and after a process is completed. The industrial machine communication part 102 also receives a name of the industrial machine 20 that transmits the machine side object ID and the collected information.

For example, the industrial machine communication part 102 may maintain integrity (synchronization) between variables stored by the control device 10 and variables stored by the industrial machines 20. In this case, a value of a variable stored by the control device 10 may be changed to a value of the variable stored by the industrial machines 20, or, conversely, the value of the variable stored by the industrial machines 20 may be changed to the value of the variable stored by the control device 10. It is also possible that the variable integrity is mainly maintained by the industrial machines 20.

Identification Part

The identification part 103 identifies one or more processes executed with respect to an object based on predetermined information received from one or more industrial machines 20. The predetermined information may be any information that can identify the one or more processes executed with respect to an object. In the first embodiment, the case is described where a pair of a name of an industrial machine 20 and a machine side object ID corresponds to the predetermined information. The predetermined information is not limited to the example of the first embodiment, and may be any information. For example, it is also possible that only a name of an industrial machine 20 corresponds to the predetermined information, or only a machine side object ID corresponds to the predetermined information.

In the first embodiment, since a machine side object ID is generated by an industrial machine 20, the predetermined information includes a machine side object ID of an object generated on the one or more industrial machines 20 side. The identification part 103 identifies one or more processes executed with respect to an object corresponding to a machine side object ID received from one or more industrial machines 20. The identification part 103 refers to a machine side object ID received from the industrial machines 20 and identifies for which object a process has been executed. When a machine side object ID received from an industrial machine 20 that has executed a certain process and a machine side object ID received from an industrial machine 20 that has executed another process are the same, the identification part 103 determines that these processes have been executed with respect to the same object.

In the first embodiment, since the multiple processes (p3, p4) are executed in the single industrial machine (20C), the identification part 103 identifies which of the multiple processes that the single industrial machine (20C) can execute has been executed. Since the industrial machine (20C) executes either the process (p3) or the process (p4) with respect to an object, the predetermined information includes a name of a process executed with respect to an object. The identification part 103 refers to the name of the process received from the industrial machine (20C) and identifies whether the industrial machine (20C) has executed the process (p3) or the process (p4).

In the first embodiment, since the industrial machines 20 that execute the processes are defined in the process management data (D2), when a machine side object ID and collected information of a certain object is received from a certain industrial machine 20, the identification part 103 identifies a process executed with respect to the object based on the name of the industrial machine 20 and the process management data (D2). A name of an industrial machine 20 is transmitted to the control device 10 along with a machine side object ID and collected information.

The identification part 103 identifies a process executed with respect to an object by identifying a name of a process associated with a received name of an industrial machine 20 in the process management data (D2). In the first embodiment, the processes (p1, p2, p5, p6) are identified by the names of the industrial machines 20, and the processes (p3, p4) are identified by the name of the process received from the industrial machine (20C).

Assigning Part

The assigning part 104 assigns one or more process IDs related to one or more processes to collected information about an object collected from one or more industrial machines 20. The term "assign" here is to associate a process ID with collected information, or to allow a process ID and collected information to be searchable for each other. Associating a process ID with collected information corresponds to assigning the process ID to the collected information. In the first embodiment, as illustrated in FIG. 3, grouping a process ID and collected information in one set of target data (D) corresponds to assigning the process ID to the collected information.

A process ID is an example of process identification information. Therefore, a part described as a process ID can be read as process identification information. Process identification information may be any information that can identify a process executed with respect to an object. For example, when the same process is repeatedly executed during a certain period, process identification information may be able to identify the number of times the process has been executed during the period, or may not be able to identify the number of times the process has been executed during the period. Process identification information may be other information such as a process number or name instead of an ID. Process identification information may be in any form, for example, may be expressed by a number, a letter, or a combination of these.

For example, when the process (p1) of the first object on a certain day is executed, the assigning part 104 sets a fixed value "0000" to the first 4 digits and an initial value "0001" to the last 4 digits of the 8-digit number after "0x" of a process ID, and generates a process ID "0x00000001." The assigning part 104 assigns this process ID to the collected information of the process (p1) of the object.

When the process (p2) of the first object on a certain day is executed, the assigning part 104 sets "0001," which is the last 4 digits of the process ID of the process (p1) which is a pre-process, to the first 4 digits of the 8-digit numbers after "0x" of a process ID, and sets "0002," which is obtained by incrementing the value "0001," to the last 4 digits of the 8-digit numbers after "0x" of a process ID, and generates a process ID "0x00010002." The assigning part 104 assigns this process ID to the collected information of the process (p1) of the object.

After that, in the same manner, the assigning part 104 generates process IDs of the processes (p3-p6) (for the processes (p3, p4), only one of the two) of the first object on a certain day and respectively assigns the process IDs to the collected information of the processes (p3-p6) (for the processes (p3, p4), only one of the two). As described above, the last 4 digits of the process ID of the process (p6) are the fixed value "FFFF" meaning that it is the last process. Similarly, when the processes (p1-p6) of a second object are executed on a certain day, the assigning part 104 generates process IDs while incrementing a 4-digit numerical number, and respectively assigns the process IDs to the collected information of the processes (p1-p6).

A method for generating a process ID may be the same as the method described in Japanese Patent No. 6741923 described above. For example, a process ID in the present invention may be generated in the same manner as a process ID described in Japanese Patent No. 6741923. Similarly, a system side object ID in the present invention may be generated in the same manner as a product ID described in Japanese Patent No. 6741923. Methods for generating a process ID and a system side object ID may follow any ID generation rules, and are not limited to the methods exemplified in the present embodiment and the methods of the Japanese Patent No. 6741923. For example, process IDs may be generated to be sequential numbers each time the processes are executed, and system side object IDs may be generated to be sequential numbers regardless of dates.

In the first embodiment, the assigning part 104 further assigns a system side object ID generated by the generation part 101 to collected information. Therefore, the assigning part 104 assigns a system side object ID and a process ID to collected information. As illustrated in FIG. 3, in the object data (D1), there is a one-to-one correspondence between the process IDs and the sets of collected information. However, since it is sufficient to have one system side object ID for multiple sets of collected information, there is a one-to-many correspondence between the system side object ID and the sets of collected information.

In the first embodiment, since one set of collected information is collected for each process, the assigning part 104 respectively assigns the process IDs of the processes to the sets of collected information collected from the one or more industrial machines 20 for the processes. The assigning part 104 respectively assigns the process IDs to the sets of collected information such that there is a one-to-one correspondence between the process IDs and the sets of collected information. When there are multiple sets of collected information with respect to one process, instead of associating the process IDs with the sets of collected information on a one-to-one basis as in the first embodiment, the process IDs and the sets of collected information may be associated with each other on a one-to-many basis.

In the first embodiment, there are multiple routes for the processes that can be executed with respect to an object, one or more industrial machines 20 execute processes of one of the multiple routes with respect the object, and process IDs of one or more processes are information that can identify a route. As illustrated in FIGS. 2 and 3, there are two routes, one in which the process (p3) is executed after the process (p2) and the other in which the process (p4) is executed after the process (p2). However, which route it is can be identified based on the process IDs.

In the first embodiment, since the processes illustrated in FIGS. 2 and 3 are sequentially executed with respect to each of multiple objects, the same processes are executed with respect to each of one object and the other objects. The assigning part 104 makes the process ID of the same process assigned to the collected information of one object different from the process ID of the same process assigned to the collected information of another object. For example, since the manufacturing number on a certain day is incremented, the process ID of the first process (p1) executed with respect to a certain object is different from the process ID of the first process (p1) executed with respect to the next object. The method of making the process IDs different is not limited to incrementing the manufacturing number, and may be any method. For example, numerical numbers of some process IDs may be decreased, or an increase or decrease amount of the numerical numbers may be 2 or more.

1-3-2. Functions Realized by Industrial Machines

The industrial machines (20A-20E) are the same in function, and thus are collectively described as an industrial machine 20. As illustrated in FIG. 4, in the industrial machine 20, a data storage part 200 and a process execution part 201 are realized. The data storage part 200 is mainly realized by the storage part 22, and the process execution part 201 is mainly realized by the CPU 21.

Data Storage Part

The data storage part 200 stores data required for executing the processes. For example, the data storage part 200 stores a process program in which operations of the processes are defined, and stores variables for which at least one of referencing and changing is performed by the process program. In the process program, execution conditions of the processes and detailed operations of the processes are defined. The process program can be created in any language such as a ladder language or a robot language. Further, for example, the data storage part 200 stores the name of industrial machine 20. Further, for example, the data storage part 200 stores a machine side object ID and collected information. The machine side object ID and the collected information may be erased after being transmitted to the control device 10.

Process Execution Part

The process execution part 201 executes a process based on the process program. The process execution part 201 executes the process program and determines whether or not an execution condition of a process is satisfied. An execution condition may be any condition, for example, may be that a predetermined variable has reached a predetermined value, that a predetermined signal is received from a sensor, that an object has moved to a predetermined position, that a predetermined time is reached, that predetermined information is received from another industrial machine 20, or that a predetermined instruction is received from the control device 10. When an execution condition of a process is satisfied, the process execution part 201 executes the process.

In the first embodiment, when a process is executed, the process execution part 201 transmits a machine side object ID and collected information to the control device 10. When any information is transmitted from an industrial machine 20 to the control device 10, the name of the industrial machine 20 is also transmitted. For example, the process execution part 201 of the industrial machine (20A) generates a machine side object ID based on a predetermined ID issuance rule. The ID issuance rule may be any rule as long as it is a rule such that the machine side object ID is not a duplicate of other objects. The process execution parts 201 of the industrial machines (20B-20E) may receive the above generated machine side object ID.

Based on an execution result of a process of a certain object, the process execution part 201 generates collected information of the object. The collected information may include any content, for example, may include a date and time when execution of a process is started, a date and time when the execution of the process is completed, a code indicating whether or not the process is normally completed, a date and time when the collected information is generated, a parameter used during the execution of the process, a physical quantity detected using a sensor, or a combination of these. The process execution part 201 generates the collected information based on an execution result of the process program, a date and time acquired by using a real-time clock, a signal from a sensor, or a combination of these.

1-3-3. Functions Realized by Collection Device

As illustrated in FIG. 4, the collection device 30 includes a data storage part 300, and a storage part 301. The data storage part 300 is mainly realized by the storage part 32, and the storage part 301 is mainly realized by the CPU 31. The data storage part 300 stores an object database (DB) in which the object data (D1) of multiple objects is stored.

FIG. 6 illustrates a data storage example of the object database (DB). As illustrated in FIG. 6, the object database (DB) stores multiple sets of object data (D1) received by the collection device 30 from the control device 10. The storage part 301 stores collected information assigned with process IDs of one or more processes in the object database (DB). Each time object data (D1) is received from the control device 10, the storage part 301 stores the object data (D1) in the object database (DB). The object data (D1) stored in the object database (DB) is acquired at any timing such as after the object is shipped. For example, the object data (D1) is used to analyze the cause when a defect occurs in an object.

1-4. Processing Executed by Information Collection System

Figure 7:
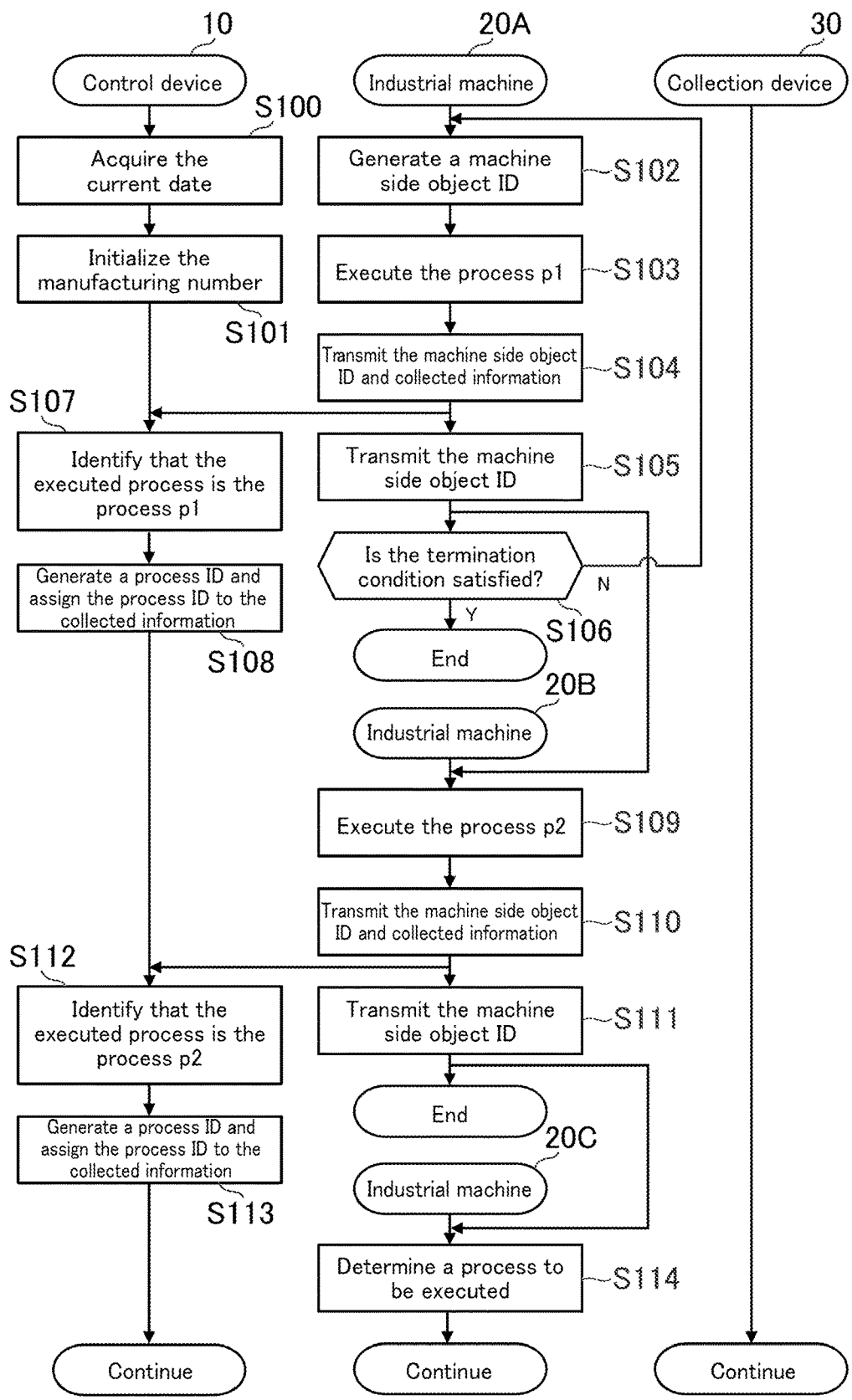
FIG. 7 is a flow diagram illustrating an example of processing executed by the information collection system of the first embodiment.
Figure 8:
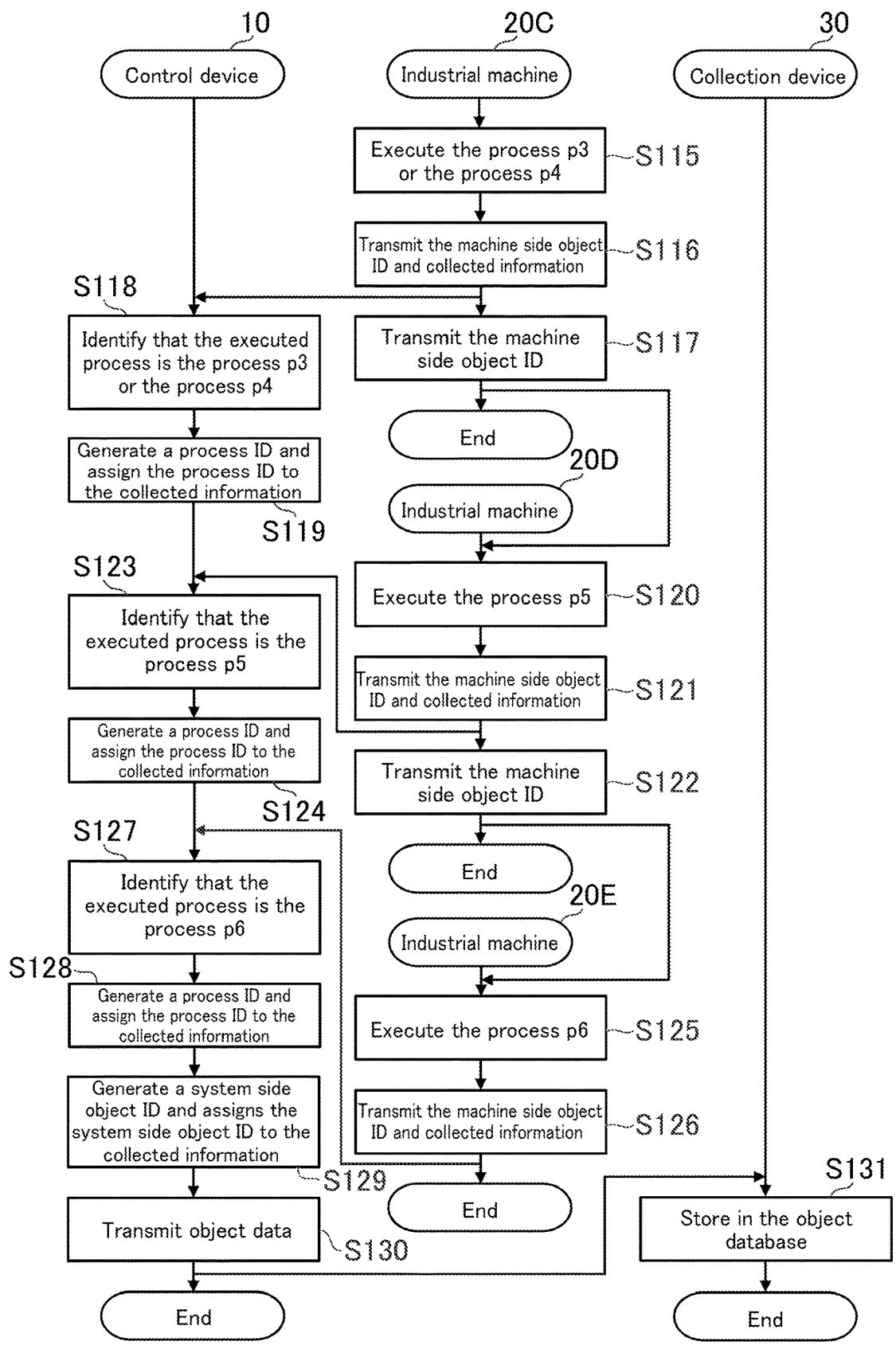
FIG. 8 is a flow diagram illustrating an example of processing executed by the information collection system of the first embodiment.

FIGS. 7 and 8 are flow diagrams illustrating an example of processing executed by the information collection system 1 of the first embodiment. The CPUs (11, 21, 31) and the IoT part 14 respectively execute the programs stored in the storage parts (12, 22, 32) and the IoT part 14, and thereby, the processing illustrated in FIGS. 7 and 8 is executed. The processing illustrated in FIGS. 7 and 8 is an example of processing executed by the functional blocks illustrated in FIG. 4. The processing illustrated in FIGS. 7 and 8 is executed when the process (p1) of the first object on a certain day is started.

As illustrated in FIG. 7, the control device 10 acquires a current date (S100) and initializes the manufacturing number (S101). The date acquired in S100 is used as the first 6 digits of a system side object ID. The manufacturing number initialized in S101 is used as the last 4 digits of a system side object ID while being incremented. The date and the manufacturing number are stored in the storage part 12.

The industrial machine (20A) generates a machine side object ID of an object to be executed in the process (p1) (S102), and executes the process (p1) with respect to the object based on the process program of the process (p1) (S103). The industrial machine (20A) transmits the machine side object ID and collected information to the control device 10 (S104), and transmits the machine side object ID to the industrial machine (20B) (S105). In S104 and S105, some information that can be identified as information transmitted from the industrial machine (20A), such as the name of the industrial machine (20A), is also transmitted.

The industrial machine (20A) determines whether or not a predetermined termination condition is satisfied (S106). The termination condition is any condition for terminating the present process, and may be any condition. For example, completion of all processes of all objects on a certain day corresponds to the termination condition. Further, for example, arrival of a predetermined time on a certain day corresponds to the termination condition. When it is not determined that the termination condition is satisfied (S106; N), the processing returns to S102, a machine side object ID of the next object is generated, and the process (p1) for the next object is executed. After that, the processing of S102-S105 is executed with respect to the next object. The process (p1) of the next object may be started after all the processes of the object for which a process is being executed are completed.

Upon receiving the machine side object ID and the collected information from the industrial machine (20A), the control device 10 identifies based on the process management data (D2) that the process executed with respect to the object is the process (p1) (S107), and generates a process ID of the process (p1) and assigns the process ID to the collected information of the process (p1) (S108). The process ID and the collected information of the process (p1) are associated with each other and are stored in the storage part 12.

Subsequent processing of S109-S128 is executed between the control device 10 and the industrial machines (20B-20E) in a similar manner to the processing of S103-S108. However, since the industrial machine (20C) executes either the process (p3) or the process (p4), in S114, when the machine side object ID of the object to be executed in the process (p3) or the process (p4) is received from the industrial machine (20B), the industrial machine (20C) determines whether to execute the process (p3) or the process (p4) (S114). In S114, the industrial machine (20C) determines whether or not an execution condition of the process (p3) is satisfied or whether or not an execution condition of the process (p4) is satisfied. Among the process (p3) and the process (p4), the industrial machine (20C) determines to execute a process for which an execution condition is satisfied. For example, the process (p3) and the process (p4) may be alternately executed, or an optimum one may be selected and executed according to an arrangement of objects in the line or cell.

When the processing up to S128 is executed, the control device 10 generates a system side object ID by combining the date acquired in S100 and the manufacturing number initialized in S101 or the manufacturing number incremented at any timing, and assigns the system side object ID to the collected information of the object for which all the processes have been completed (S129). In S129, the control device 10 assigns the system side object ID to the five sets of collected information to which the five process IDs are respectively assigned, and generates object data (D1). The control device 10 increments the manufacturing number included in the system side object ID at any subsequent timing.

The control device 10 transmits the object data (D1) to the collection device 30 (S130). Upon receiving the object data (D1), the collection device 30 stores the object data (D1) in the object database (DB) (S131). When it is determined in S106 that the termination condition is satisfied (S106; Y), the present processing terminates after S107-S131 are executed with respect to the last object. Until all the processes of all the objects on a certain day are completed, the processing of S102-S131 is repeated.

According to the information collection system 1 of the first embodiment, one or more processes executed with respect to an object are identified based on predetermined information received from one or more industrial machines 20, and process IDs of the identified one or more processes are assigned to collected information of the object collected from the one or more industrial machines 20, and thereby, based on the information received from the one or more industrial machines 20, traceability with respect to the object can be ensured. For example, when the control device 10 and the one or more industrial machines 20 are communicably connected to each other, it may be possible that the control device 10 does not give specific control instructions to the one or more industrial machines 20, and the one or more industrial machines 20 individually execute the processes. Even in such a case, on the control device 10 side (the information collection system 1 side), traceability of the collected information can be ensured by identifying one or more processes actually executed with respect to an object based on the predetermined information received from the one or more industrial machines 20. That is, even when the processes of the one or more industrial machines 20 are not mainly controlled by the control device 10, it is possible to identify which process with respect to which object the collected information is for.

Further, in the information collection system 1, even when a certain object ID is not generated on the information collection system 1 side and is transmitted to the one or more industrial machines 20, based on the machine side object ID issued on the industrial machine 20 side, it is possible to identify which process with respect to which object is executed. Since the information collection system 1 only needs to receive the machine side object ID from the one or more industrial machines 20, the number of exchanges between the information collection system 1 and the one or more industrial machines 20 can be reduced. As a result, a processing load on the information collection system 1 side can be reduced, and communication traffic between the information collection system 1 and the one or more industrial machines 20 can be reduced. Further, even when the one or more industrial machines 20 are not mainly controlled on the information collection system 1 side, it is possible to reliably identify an object with respect to which a process has been executed.

Further, in the information collection system 1, by further assigning the system side object ID generated on the information collection system 1 side to the collected information, traceability can be improved. For example, when a machine side object ID generated on the one or more industrial machines 20 side is used as it is, in a case such that where object s are assembled, it is possible that a huge number of machine side object IDs are included with respect to one product. In this regard, by assigning the system side object ID generated on the information collection system 1 side to the collected information, management of the collected information can be facilitated. For example, when an object becomes a final product, by assigning one system side object ID, the collected information can be managed using the one system side object ID.

Further, in the information collection system 1, by storing collected information assigned with process IDs of one or more processes in the object database (DB), the collected information can be referred to at any timing such as after an object for which all the processes have been executed has been shipped, and traceability of the collected information can be improved.

Further, in the information collection system 1, by assigning a process ID of each process to collected information collected for the process, the collected information of the process can be associated with the process ID of the process on a one-to-one basis, and traceability of the collected information can be improved.

Further, in the information collection system 1, when there are multiple routes for the processes that can be executed with respect to an object, since a route actually followed by an object can be identified, traceability can be improved.

Further, in the information collection system 1, when a certain industrial machine 20 can execute multiple processes, since which process is executed with respect to an object can be identified, traceability can be improved.

Further, in the information collection system 1, even when the same process is executed with respect to each of one object and other objects, since different process IDs are assigned to the sets of collected information, it is possible to distinguish when a process was executed. For example, by making the process ID of the process (p1) executed the third time on a certain day and the same process (p1) executed the tenth time on the day different, since it is possible to distinguish between the third execution of the process (p1) on the day and the tenth execution of the process (p1) on the day, traceability can be improved.

Further, in the information collection system 1, by further assigning a system side object ID generated on the information collection system 1 side, it is possible to increase certainty of traceability.

2. Second Embodiment

Next, a second embodiment is described. The second embodiment is the same as the first embodiment in that the processes are mainly executed by the industrial machines 20, but is different from the first embodiment in the method for identifying a process executed with respect to an object. In the second embodiment, even when the industrial machines 20 do not transmit a machine side object ID to the control device 10, the control device 10 can identify a process executed with respect to an object. In the second embodiment, since it is not necessary to generate a machine side object ID, a system side object ID is simply described as an object ID. Description about other structural components that are the same as those in the first embodiment is omitted.

Figure 9:
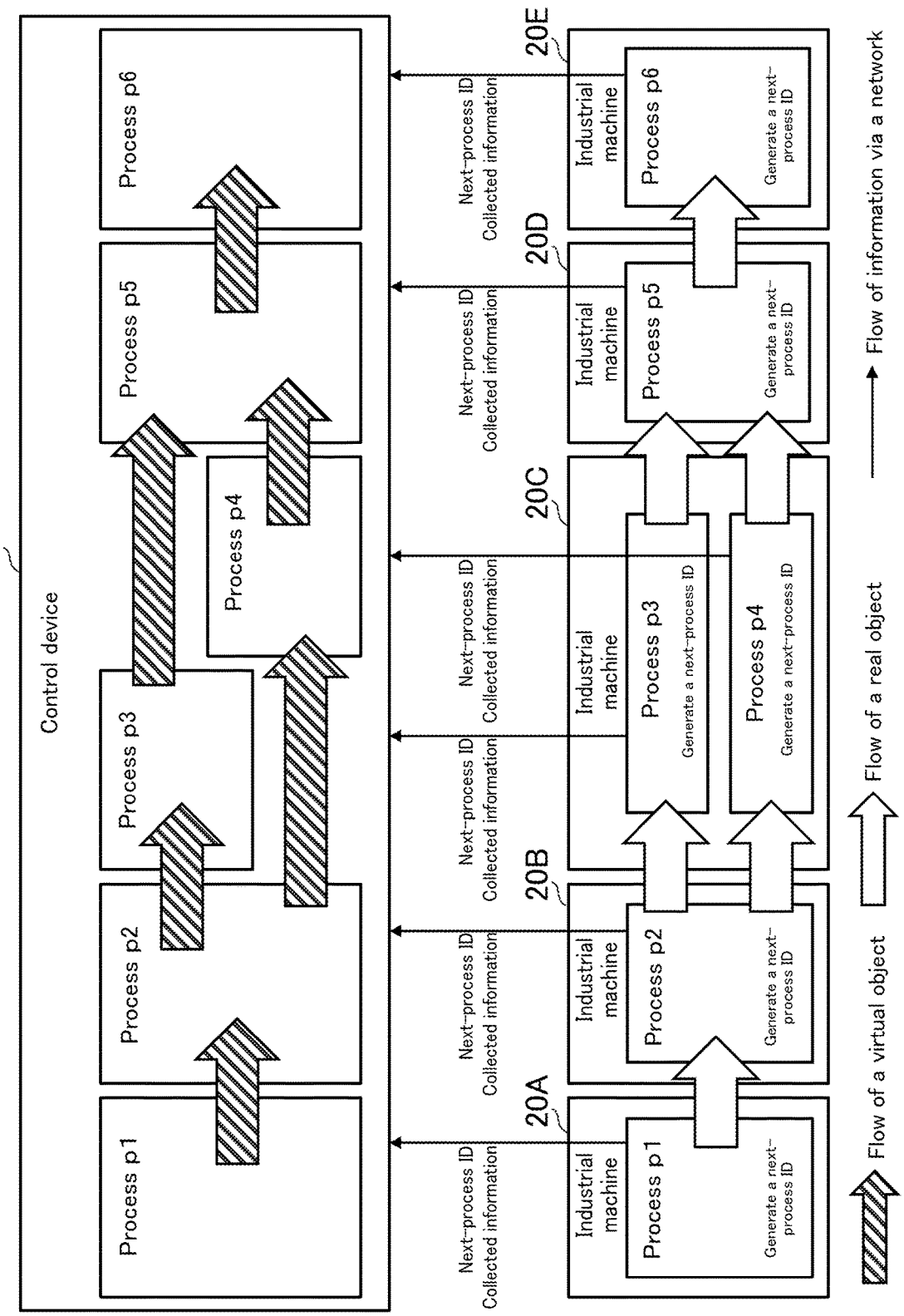
FIG. 9 illustrates an example of flows of an object and information in a second embodiment.

FIG. 9 illustrates an example of flows of an object and information in the second embodiment. In the example of FIG. 9, since it is not necessary to transmit or receive information between the industrial machines 20, white arrows indicate only a flow of an actual object. As illustrated in FIG. 9, in the second embodiment, an industrial machine 20 generates a next-process ID that identifies a next-process, which is a process to be executed next to a process to be executed by the industrial machine 20 itself.

It is assumed that the control device 10 can identify in advance a process indicated by a value of a next-process ID. For example, a relationship between a next-process ID and which process is a next-process is stored in advance in the control device 10, such as that next-process IDs of 1-6 respectively mean processes (p1-p6) as next-processes. In addition, for example, a next-process ID may be the last four digits of a process ID. In this case, the industrial machine (20A) generates a next-process ID such that the next-process ID is "n+1" (where n is an integer equal to or greater than 0, for example, a numerical number that is incremented for each object). Similarly, the industrial machines (20B-20D) respectively generate next-process IDs such that the next-process IDs are respectively "n+1"–"n+3" (where n is an integer equal to or greater than 0, for example, a numerical number indicating the number of an object on a certain day). Since there is no next-process for the industrial machine (20E), the industrial machine (20E) may generate a next-process ID such that the next-process ID has a fixed value of "FFFF" (or, a numerical number such as "9000" converted to "FFFF").

For example, when the process (p1) is executed with respect to a certain object, the industrial machine (20A) generates a next-process ID of the process (p2) as a next-process ID of the object, and transmits the next-process ID together with collected information to the control device 10. That the next-process is the process (p2) may be defined in the process program of the process (p1) or may be defined in another program. When there are multiple candidates that can be next-processes, a condition for becoming a next-process is predetermined for each of the candidates. This condition is a condition that can be determined by information such as a physical quantity detected by a sensor, and a next-process corresponding to a condition that is determined to be satisfied by the information is executed. A method for identifying a next-process is not limited to these examples, and the industrial machine (20A) may store information that can identify a next-process. This point also applies to the industrial machines (20B-20E). The collected information may be acquired in the same manner as in the first embodiment.

The control device 10 refers to the next-process ID received from the industrial machine (20A) and identifies that the process (p2) is to be executed as a next-process with respect to an object for which the process (p1) has been completed. Since the control device 10 can identify based on the process management data (D2) that the industrial machine (20B) executes the process (p2), the control device 10 waits to receive a next-process ID and collected information from the industrial machine (20B). Since the control device 10 can identify based on the process management data (D2) that the industrial machine (20A) executes the process (p1) as the first process, similar to the first embodiment, the control device 10 may generate a process ID and assigns the process ID to the collected information received from the industrial machine (20A).

After that, similar to the industrial machine (20A), when the processes (p2-p5) are executed with respect to a certain object, the industrial machines (20B-20D) respectively generate next-process IDs of the processes (p3-p6) as next-process IDs of the object, and each transmit a generated next-process ID together with collected information to the control device 10. Similar to the case where a next-process ID and collected information are received from the industrial machine (20A), the control device 10 identifies a next-process based on a next-process ID received from the industrial machines (20B-20D). The control device 10 waits to receive a next-process ID and collected information from the industrial machines (20C-20D) executing the identified next-process. The control device 10 can identify a next-process, and thus can generate a process ID as illustrated in FIG. 3, and assigns the generated process ID to the collected information.

In the second embodiment, the industrial machine (20B) determines whether the process (p3) or the process (p4) is to be executed with respect to an object. When the industrial machine (20B) determines that the process (p3) is to be executed with respect to an object, the industrial machine (20B) generates a next-process ID indicating the process (p3), and transmits the next-process ID together with collected information to the control device 10. When the industrial machine (20B) determines that the process (p4) is to be executed with respect to an object, the industrial machine (20B) generates a next-process ID indicating the process (p4), and transmits the next-process ID together with collected information to the control device 10. The industrial machine (20B) may notify the industrial machine (20C) whether the process (p3) or the process (p4) is to be executed, or the industrial machine (20C) may identify whether the process (p3) or the process (p4) is to be executed from a detection signal of a sensor.

When the process (p6) is executed with respect to an object for which the process (p5) has been completed, since there is no next-process, the industrial machine (20E) generates a fixed value as a next-process ID indicating that there is no next-process, and transmits the next-process ID together with collected information to the control device 10. When the control device 10 receives a next-process ID indicating that there is no next-process, since the control device 10 can determine that it is the last process, the control device 10 generates a process ID of the process (p6) as illustrated in FIG. 3 and assigns the process ID to the collected information. Similar to the first embodiment, the control device 10 generates an object ID and assigned the object ID to collected information, and generates object data (D1) of an object for which all the processes have been completed. The object data (D1) has the same structure as in the first embodiment. That the object data (D1) is transmitted to the collection device 30 at any timing is also the same as in the first embodiment.

In the second embodiment, "predetermined information" used in the processing of the identification part is a next-process ID generated for each process on the one or more industrial machines 20 side. The next-process ID is an example of other process information. Therefore, a part described as a next-process ID can be read as other process information.

The other process information is information about at least one of a next-process and a pre-process. The other process information may indicate only a next-process, or may indicate only a pre-process, or may indicate both a next-process and a pre-process. A next-process is a process one later in the order. A pre-process is a process one before in the order. The other process information may be information of any name such as a number or a name instead of an ID. The other process information may be in any form, for example, may be expressed by a number, a letter, or a combination of these.

The identification part 103 identifies one or more processes executed with respect to an object based on a next-process ID received for each process from the one or more industrial machines 20. For example, based on a next-process ID received from an industrial machine 20 that has executed a certain process, the identification part 103 identifies a next-process to be executed next, or identifies that the process is the last process. Further, for example, based on a pre-process ID received from an industrial machine 20 that has executed a certain process, the identification part 103 identifies a pre-process that has been executed before the process, or identifies that the process is the first process.

Similar to the first embodiment, the assigning part 104 may generate a process ID based on a process identified by the identification part 103. For example, the assigning part 104 may combine a pre-process ID and a next-process ID to form a process ID. Next-process IDs may be sequentially numbered from 1, and 9000 may be used as production completion, and 9001 and later may be used for NG objects.

Even when the other process information is a pre-process ID that can identify a pre-process, similar to the case of a next-process ID, the identification part 103 may identify a pre-process, and the assigning part 104 may generate a process ID and assign the process ID to the collected information. For example, for the process (p1), since there is no pre-process, the pre-process ID is a fixed value. When a pre-process ID of a fixed value is received from the industrial machine (20A), the identification part 103 identifies that there is no pre-process and the process (p1) is the first process. When it is identified that the process (p1) is the first process, the assigning part 104 generates a process ID such that "0000" indicating that effect is the first 4 digits of the 8-digit numerical number, and assigns the process ID to the collected information.

Since the pre-process of the process (p2) is the process (p1), when a pre-process ID indicating that a pre-process is the process (p1) is received from the industrial machine (20B), the identification part 103 identifies that the pre-process of the process (p2) is the process (p1). When it is identified that the process (p1) is a pre-process, the assigning part 104 sets the last 4 digits of the process ID corresponding to the process (p1) to the first 4 digits of the 8-digit numerical number of the process ID corresponding to the process (p2). The assigning part 104 may use a numerical number obtained by incrementing this 4-digit numerical number as the last 4 digits to generate a process ID corresponding to the process (p2), and may assign the process ID to the collected information.

After that, in the same manner, when a pre-process ID indicating that a pre-process is one of the processes (p2-p5) is received from one of the industrial machines (20C-20E), the identification part 103 identifies the pre-process. The assigning part 104 sets the last 4 digits of the process ID corresponding to the pre-process to the first 4 digits of the 8-digit numerical number of the process ID corresponding to the process for which a process ID is to be generated. The assigning part 104 may use a numerical number obtained by incrementing this 4-digit numerical number as the last 4 digits to generate a process ID corresponding to a process for which a process ID is to be generated, and may assign the process ID to the collected information. Since the identification part 103 can identify based on the process management data (D2) that the process (p6) is the last process, the assigning part 104 may set the last four digits of the process ID corresponding to the process (p6) to a fixed value "FFFF." The other process information may include both a pre-process ID and a next-process ID.

Figure 10:
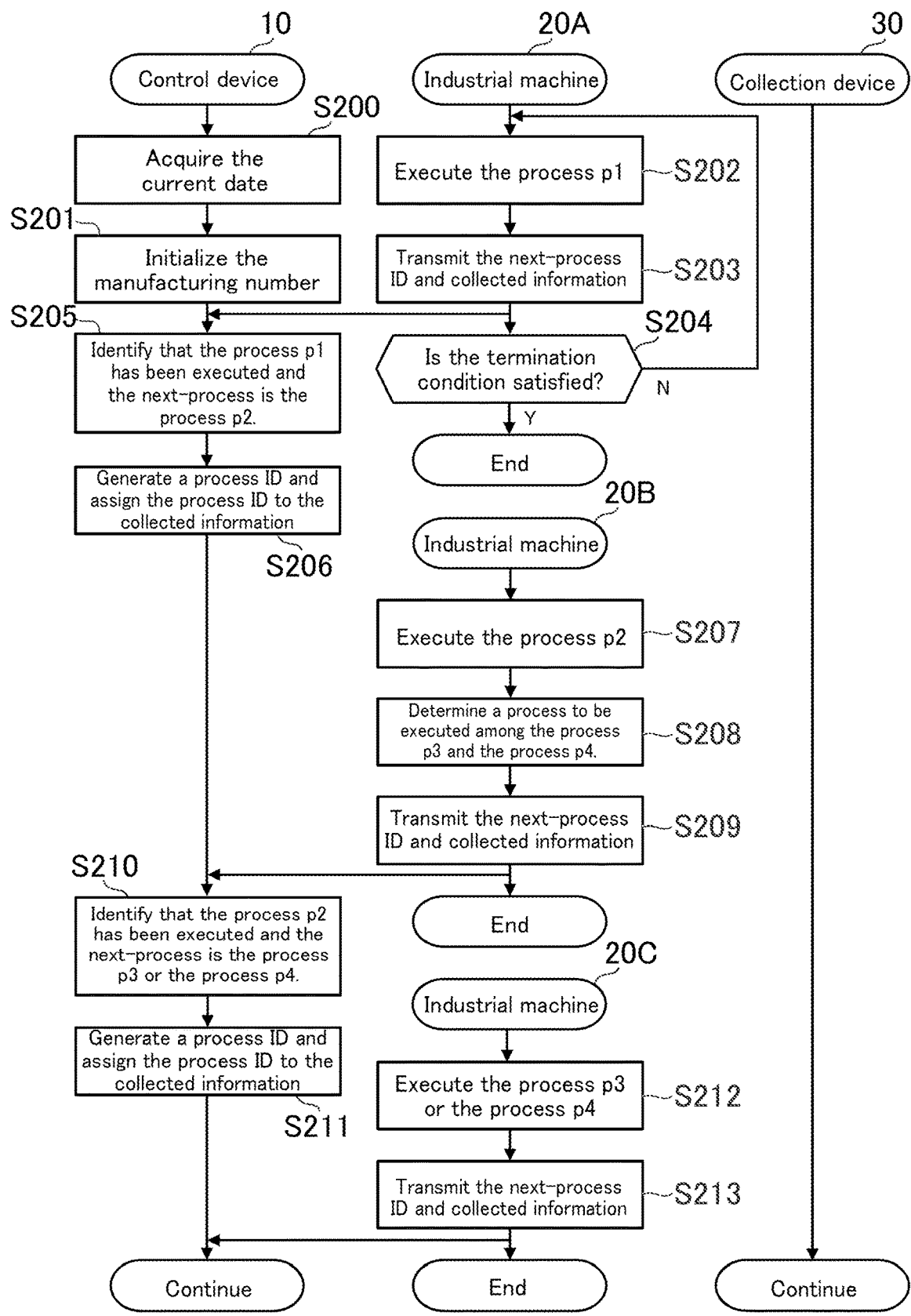
FIG. 10 is a flow diagram illustrating an example of processing executed by an information collection system of the second embodiment.
Figure 11:
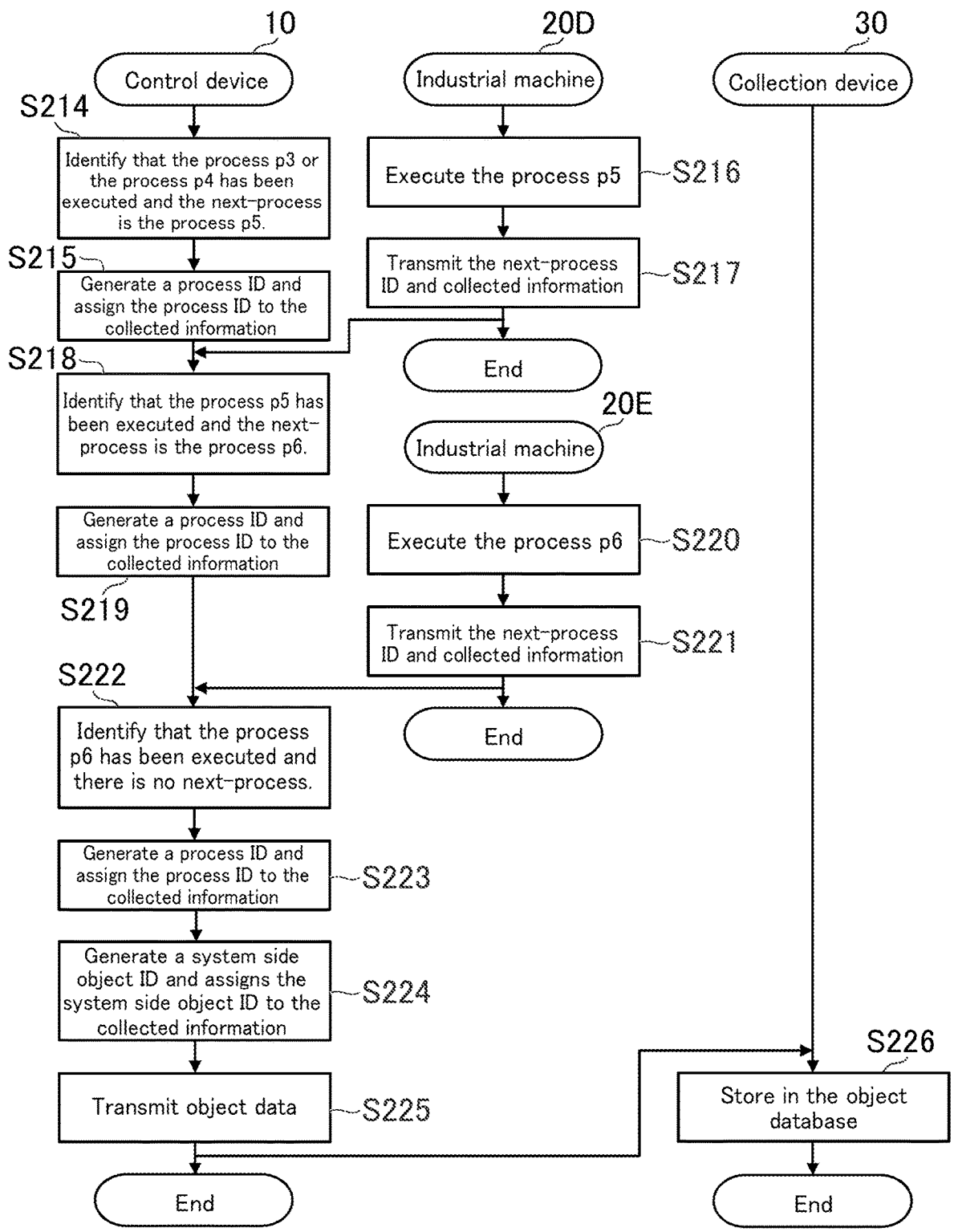
FIG. 11 is a flow diagram illustrating an example of processing executed by the information collection system of the second embodiment.

FIGS. 10 and 11 are flow diagrams illustrating an example of processing executed by the information collection system 1 of the second embodiment. Processing of S200-S202 is the same as the processing of S100-S101, and S103. The industrial machine (20A) generates a next-process ID indicating that a next-process is the process (p2), and transmits the next-process ID and collected information to the control device 10 (S203). Subsequent processing of S204 is the same as the processing of S106.

Upon receiving the next-process ID and the collected information, the control device 10 identifies that the executed process is the process (p1) and the next-process is the process (p2) (S205). Subsequent processing of S206 is the same as the processing of S108, but is different from the first embodiment in that the control device 10 waits to receive, from the industrial machine (20B) that executes the process (p2) indicated by the next-process ID, a next-process ID and collected information. When the next-process ID and the collected information are received from the industrial machine (20B), the control device 10 determines that the process (p2) identified in S205 has been executed. That is, the control device 10 determines that the process (p2) as the next-process has been executed with respect to the same object as the object with respect to which the process (p1) has been executed by the industrial machine (20A).

Subsequent processing of S207-S223 is executed between the control device 10 and the industrial machines (20B-20E) in a similar manner to the processing of S202, S203, S205, and S206. When each of the industrial machines (20B-20E) executes a process to be executed by the industrial machine, the each of the industrial machines (20B-20E) generates a next-process ID, and transmits the next-process ID and collected information to the control device 10. When an executed process and a next-process are identified, the control device 10 may generate a process ID and assign the process ID to the collected information. However, in the second embodiment, since the industrial machine (20B) needs to determine whether the process (p3) or the process (p4) is to be executed in order to generate a next-process ID, in S208, the industrial machine (20B) determines a process to be executed among the process (p3) and the process (p4). The processing of S208 differs only in entity that performs the execution, and has the same content as the processing of S114. Processing of S224-S226 is the same as the processing of S129-S131.

According to the information collection system 1 of the second embodiment, by receiving the other process information about at least one of a next-process and a pre-process generated for each process on the one or more industrial machines 20 side, it is possible to identify which process with respect to which object has been executed. Since the information collection system 1 only needs to receive the other process information from the one or more industrial machines 20, the number of exchanges between the information collection system 1 and the one or more industrial machines 20 can be reduced. As a result, a processing load on the information collection system 1 side can be reduced, and communication traffic between the information collection system 1 and the one or more industrial machines 20 can be reduced. Further, even when the one or more industrial machines 20 are not mainly controlled on the information collection system 1 side, it is possible to reliably identify an object with respect to which a process has been executed.

3. Third Embodiment

Next, a third embodiment is described. The third embodiment is the same as the first embodiment and the second embodiment in that the processes are mainly executed by the industrial machines 20, but is different from the first embodiment and the second embodiment in the method for identifying a process executed with respect to an object. In the second embodiment, the industrial machines 20 generate the next-process IDs. However, in the third embodiment, the control device 10 generates the next-process IDs. Description about other structural components that are the same as those in the first embodiment and the second embodiment is omitted.

Figure 12:
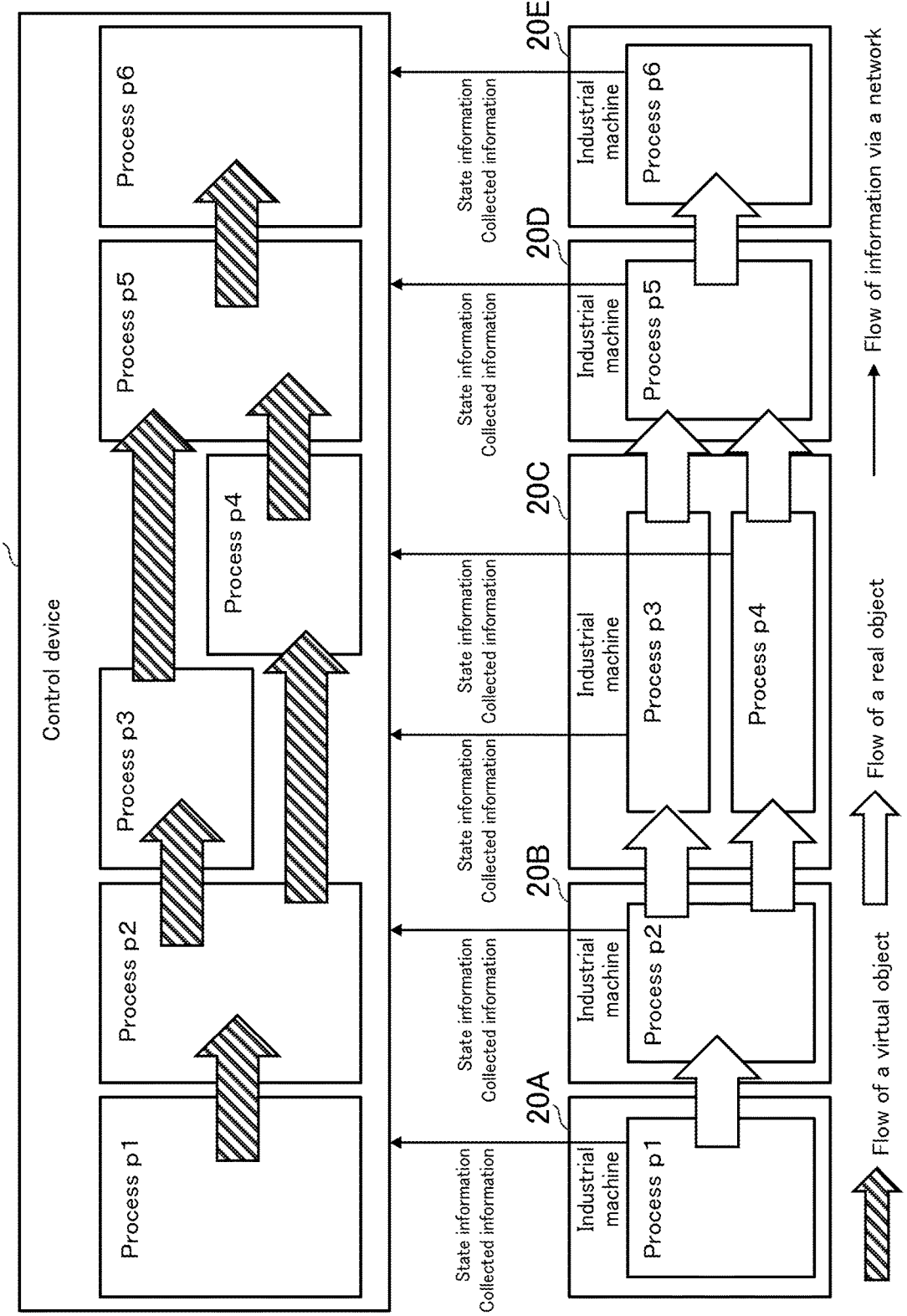
FIG. 12 illustrates an example of flows of an object and information in a third embodiment.

FIG. 12 illustrates an example of flows of an object and information in the third embodiment. As illustrated in FIG. 12, in the third embodiment, when the process (p1) is executed on a certain object, the industrial machine (20A) generates state information of the object, and transmits the state information and collected information to the control device 10. The collected information may be acquired in the same manner as in the first embodiment.

The state information may be any information that allows a next-process to be inferred on the control device 10 side, and is, for example, information required for determining a condition when a next-process ID is generated in the second embodiment. In this case, the control device 10 may determine a process corresponding to a condition satisfied by the state information as a next-process in the same manner as in the method with which an industrial machine 20 determines a next-process in the second embodiment. The state information may be any information, for example, a date and time when a process is executed with respect to an object, a physical quantity detected by a sensor, or a value of a variable. For example, when the control device 10 knows in advance time intervals at which the processes are executed, the state information includes a date and time when a process is executed with respect to an object. The control device 10 may identify a process executed with respect to an object from a date and time interval included in the state information. The collected information may correspond to the state information. In this case, the industrial machine (20A) only needs to transmit the collected information to the control device 10.

When the state information and the collected information are received from the industrial machine (20A), since the control device 10 can identify based on the process management data (D2) that the first process (p1) is executed by the industrial machine (20A), by receiving the collected information from the industrial machine (20A), the control device 10 can identify that the process (p1) has been executed with respect to a new object. The control device 10 generates a process ID in the same manner as in the first embodiment and assigns the process ID to the received collected information.

The control device 10 determines a process to be executed next to the process (p1) based on the state information received from the industrial machine (20A), and generates a next-process ID that identifies the process. For example, the control device 10 refers to the process management data (D2) and identifies that the process (p2) is executed after the process (p1). By receiving the collected information from the industrial machine (20A), it can be identified that the process (p2) is to be executed next. The control device 10 waits to receive collected information from the industrial machine (20B) that executes the process (p2).

After that, similar to the industrial machine (20A), when the processes (p2-p6) are each executed with respect to a certain object, the industrial machines (20B-20E) each transmit state information of the object and collected information to the control device 10. Similar to the case where state information and collected information are received from the industrial machine (20A), the control device 10 identifies a next-process based on the state information received from the industrial machines (20B-20E). The control device 10 waits to receive state information and collected information from the industrial machines (20C-20E) executing the identified next-process.

Whether the process (p3) or the process (p4) is to be executed after the process (p2) can also be identified based the state information. The control device 10 refers to the collected information and other information received so far and identifies whether the process (p3) or the process (p4) is to be executed. The control device 10 may wait to receive collected information from the industrial machine (20C) that executes either the identified process (p3) or the identified process (p4).

When state information and collected information are received from the industrial machine (20E), the control device 10 identifies that the process (p6) is the last process. When it is identified that the process (p6) is the last process, the control device 10 generates an object ID and assigns the object ID to the collected information, and generates object data (D1) of an object for which all the processes have been completed. The object data (D1) has the same structure as in the first embodiment. That the object data (D1) is transmitted to the collection device 30 at any timing is also the same as in the first embodiment.

In the third embodiment, "predetermined information" used in the processing of the identification part is state information related to a state of an object transmitted for each process by the one or more industrial machines 20. The identification part 103 identifies one or more processes executed with respect to an object based on state information received for each process from the one or more industrial machines 20. For example, based on the state information, the identification part 103 determines whether or not a predetermined condition is satisfied, and identifies a process corresponding to the condition determined to be satisfied as a next-process. This condition is prepared for each process that can be executed by the industrial machines 20. The identification part 103 may identify a process corresponding to a condition satisfied by the state information as a next-process. The identification part 103 may identify a pre-process instead of a next-process. In this case, the state information may be information for determining a condition related to a pre-process. The identification part 103 may identify both a next-process and a pre-process.

Figure 13:
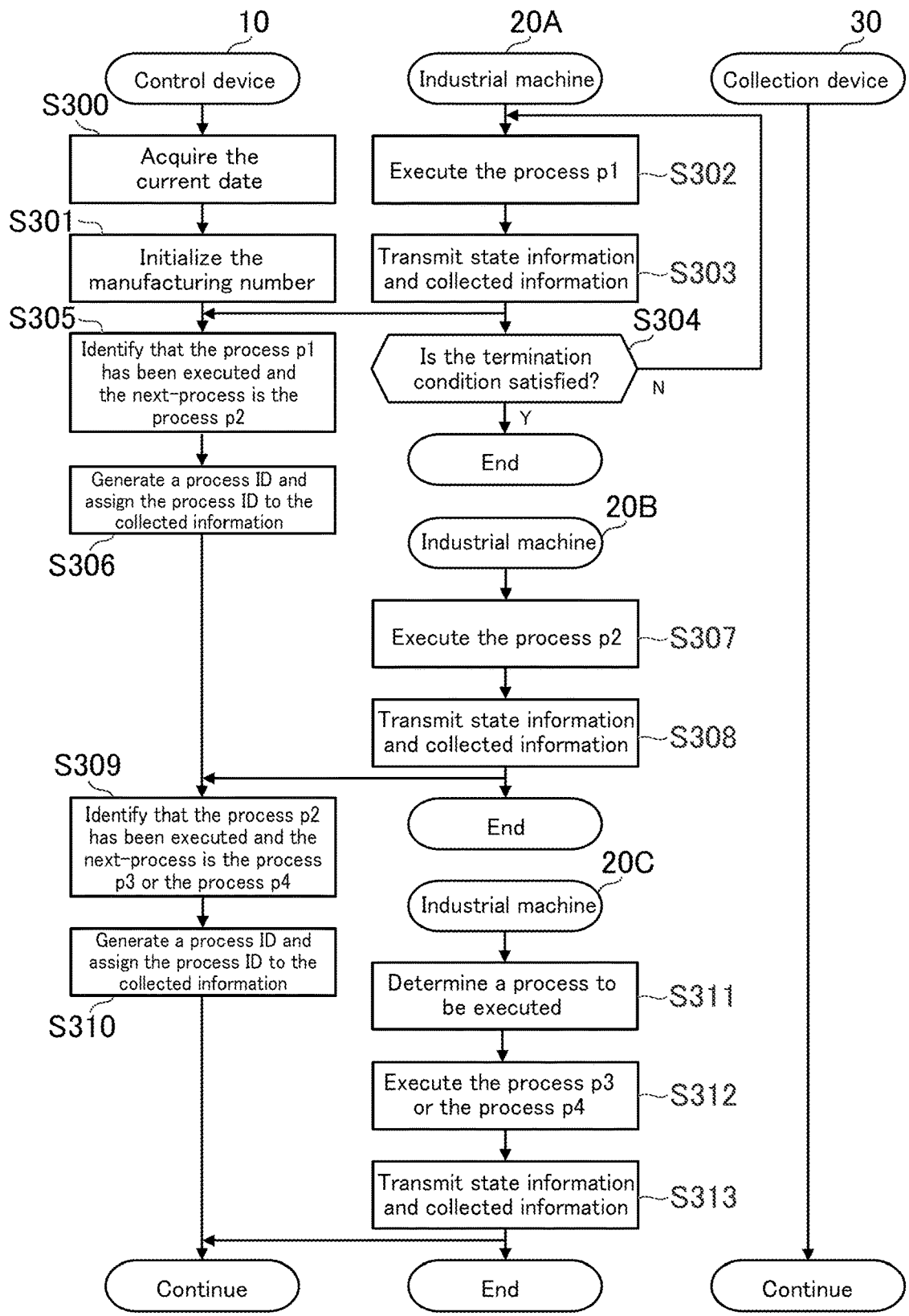
FIG. 13 is a flow diagram illustrating an example of processing executed by an information collection system of the third embodiment.
Figure 14:
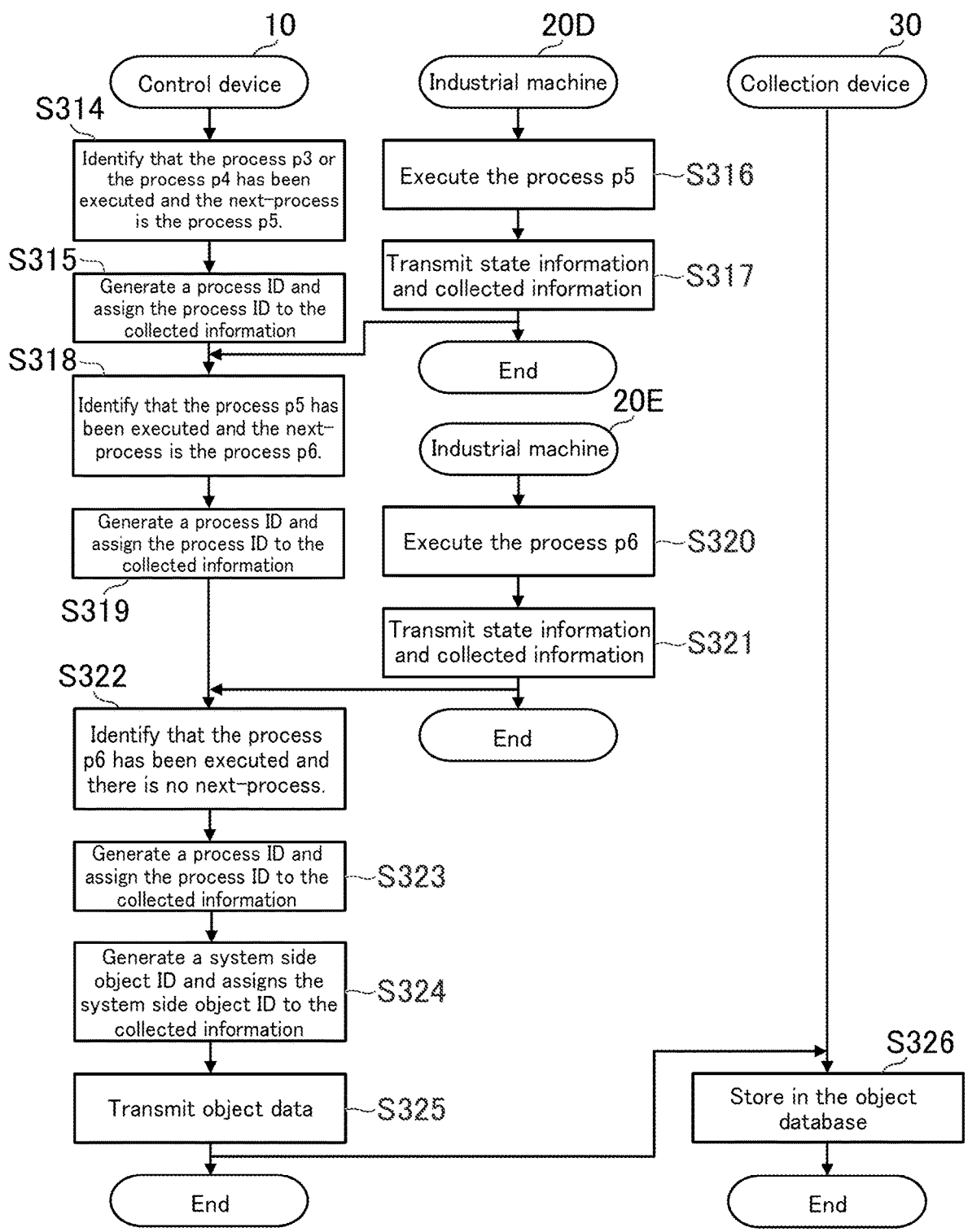
FIG. 14 is a flow diagram illustrating an example of processing executed by the information collection system of the third embodiment.

FIGS. 13 and 14 are flow diagrams illustrating an example of processing executed by the information collection system 1 of the third embodiment. Processing of S300-S302 is the same as the processing of S100-S101, and S103. The industrial machine (20A) generates state information and transmits the state information and collected information to the control device 10 (S303). Subsequent processing of S304 is the same as the processing of S106. Upon receiving the state information and the collected information, the control device 10 identifies that the executed process is the process (p1) and the next-process is the process (p2) (S305). The processing of S305 is similar to the processing of S205, but is different in that the determination of the next-process in S203 is executed on the control device 10 side based on the state information. Subsequent processing of S306 is the same as the processing of S108.

Subsequent processing of S307-S323 is executed between the control device 10 and the industrial machines (20B-20E) in a similar manner to the processing of S302, S303, S305, and S306. When each of the industrial machines (20B-20E) executes a process to be executed by the industrial machine, the each of the industrial machines (20B-20E) generates state information, and transmits the state information and collected information to the control device 10. The processing of S311 may be the same as the processing of S114. Processing of S324-S326 is the same as the processing of S129-S131.

According to the information collection system 1 of the third embodiment, by identifying one or more processes executed with respect to an object based on the state information received for each process from one or more industrial machines 20, it is possible to identify which process has been executed with respect to which object. Since the information collection system 1 only needs to receive the state information from the one or more industrial machines 20, the number of exchanges between the information collection system 1 and the one or more industrial machines 20 can be reduced. As a result, a processing load on the information collection system 1 side can be reduced, and communication traffic between the information collection system and the one or more industrial machines 20 can be reduced. Further, even when the one or more industrial machines 20 are not mainly controlled on the information collection system 1 side, it is possible to reliably identify an object with respect to which a process has been executed.

4. Fourth Embodiment

Next, a fourth embodiment is described. The fourth embodiment is different from the first-third embodiments in that the control device 10 controls processes of some industrial machines 20. In the fourth embodiment, the control device 10 controls the processes of the industrial machine (20A) and the industrial machine (20B), and for the industrial machines (20C-20E), similar to the first-third embodiments, the processes are mainly executed by the industrial machines 20. It is also possible that the control device 10 controls the processes of all the industrial machines 20. Description about other structural components that are the same as those in the first-third embodiments is omitted.

Figure 15:
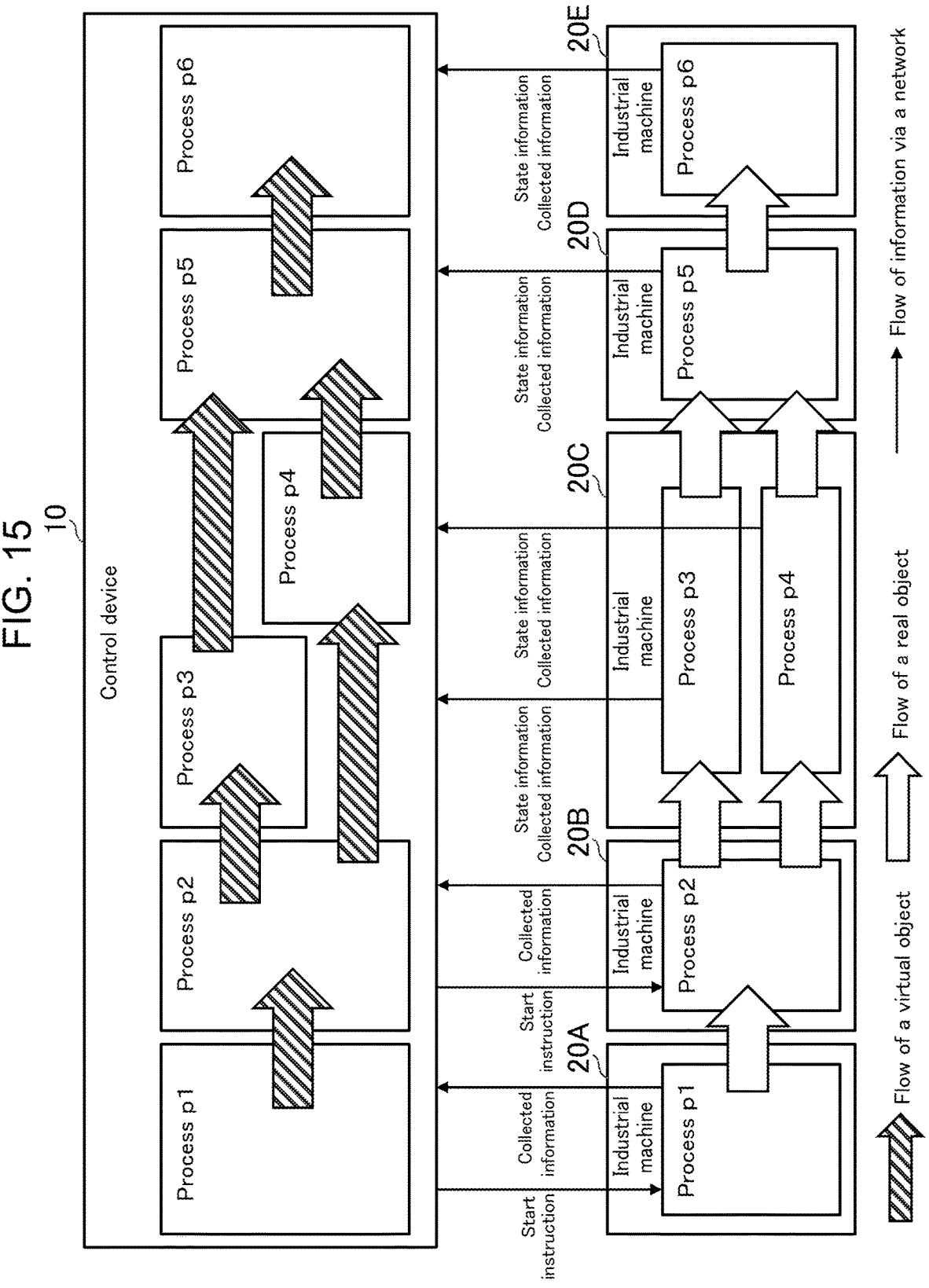
FIG. 15 illustrates an example of flows of an object and information in a fourth embodiment.

FIG. 15 illustrates an example of flows of an object and information in the fourth embodiment. As illustrated in FIG. 15, in the fourth embodiment, the control device 10 determines whether or not a condition for starting the process (p1) with respect to a certain object is satisfied, and when the condition is satisfied, the control device 10 instructs the industrial machine (20A) to start the process (p1). Upon receiving the instruction, the industrial machine (20A) starts the process (p1). When the process (p1) is completed, the industrial machine (20A) transmits collected information to the control device 10. Upon receiving the collected information from the industrial machine (20A), similar to the first embodiment, the control device 10 generates a process ID and assigns the process ID to the received collected information.

Also for the process (p2) as the next process, similar to the case of the process (p1), the control device 10 instructs the industrial machine (20B) to execute the process (p2), and assigns a process ID to collected information received from the industrial machine (20B). Since the process (p1) and the process (p2) are mainly controlled by the control device 10, when collected information is received from each of the industrial machine (20A) and the industrial machine (20B), the control device 10 can identify which process has been executed with respect to which object.

Since the processes after the process (p2) are mainly executed by the industrial machine 20 side, a method of any one of the first-third embodiments may be used. In FIG. 15, the method described in the third embodiment is used as an example. When state information and collected information are received from the industrial machine (20E), the control device 10 generates an object ID and object data (D1) of an object for which all the processes have been completed. After that, similar to the first-third embodiments, the object data (D1) is transmitted to the collection device 30.

Figure 16:
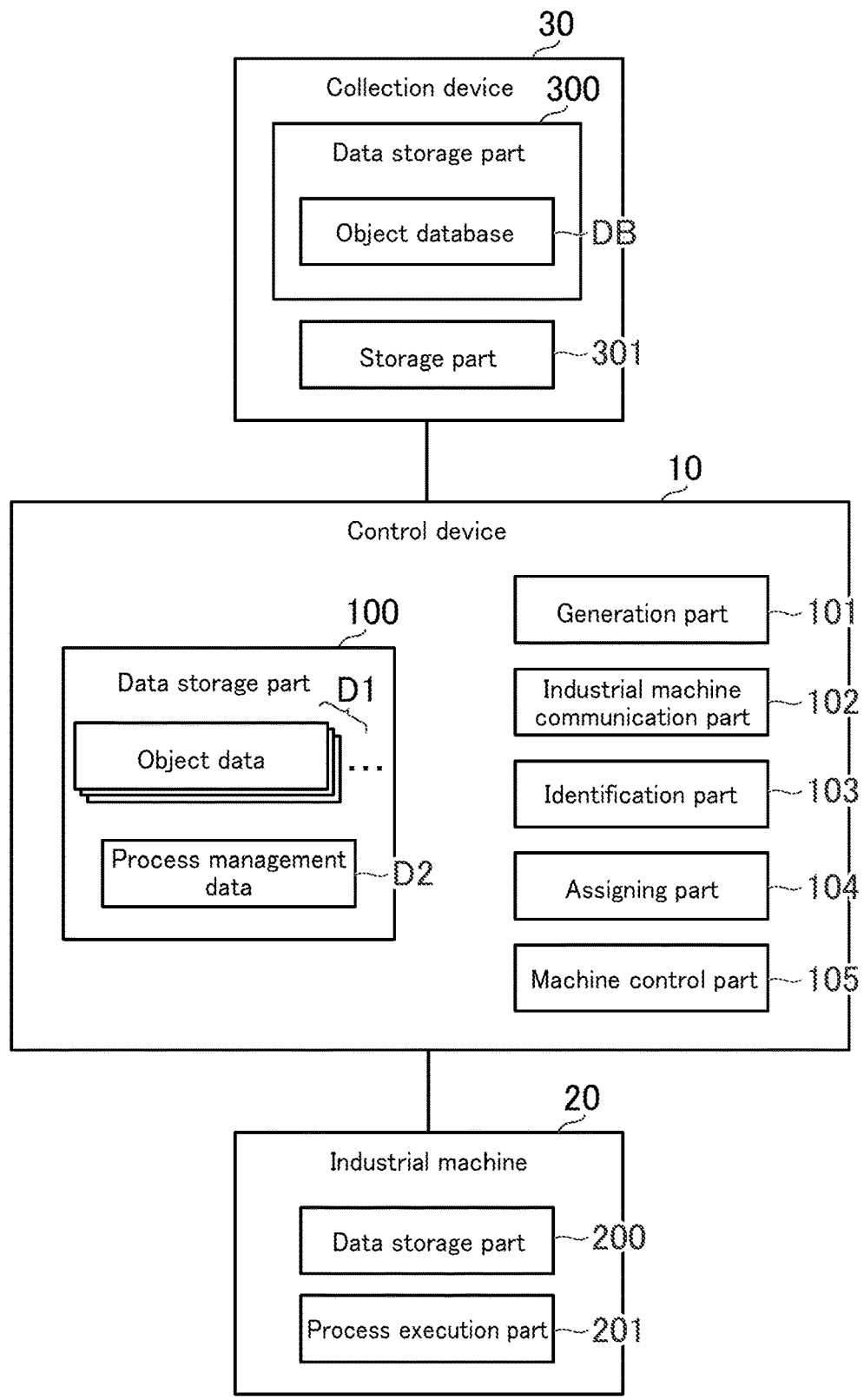
FIG. 16 is a functional block diagram of the fourth embodiment.

FIG. 16 is a functional block diagram of the fourth embodiment. As illustrated in FIG. 16, in the fourth embodiment, a machine control part 105 is realized in the control device 10. The machine control part 105 is mainly realized by the CPU 11. The industrial machine communication part 102 of the fourth embodiment communicates with each of the multiple industrial machines 20.

The machine control part 105 controls some industrial machines 20. The machine control part 105 may control one or more industrial machines 20, and the number of the industrial machines 20 controlled by the machine control part 105 is not limited to the example of the fourth embodiment. It is also possible that the machine control part 105 controls all the industrial machines 20. For example, the machine control part 105 executes a control program and transmits an instruction to start a process to an industrial machine 20 to be controlled. Upon receiving the start instruction, the industrial machine 20 starts the process. When the process is completed, the industrial machine 20 transmits a response to that effect to the control device 10. The response includes collected information. When the control device 10 receives the response, the machine control part 105 determines a process to be executed next. After that, in the same manner, the machine control part 105 controls the industrial machines 20 to be controlled.

For some industrial machines 20 (the industrial machine (20A) and the industrial machine (20B) in the example of FIG. 3), the identification part 103 identifies one or more processes executed with respect to an object based on a control content of the machine control part. For the other industrial machines 20 (the industrial machines (20C-20E) in the example of FIG. 3), the identification part 103 identifies one or more processes executed with respect to an object based on the predetermined information described in any one of the first-third embodiments. The assigning part 104 assigns a process ID of a process executed by each of the some industrial machines 20 and the other industrial machines 20 to collected information.

Figure 17:
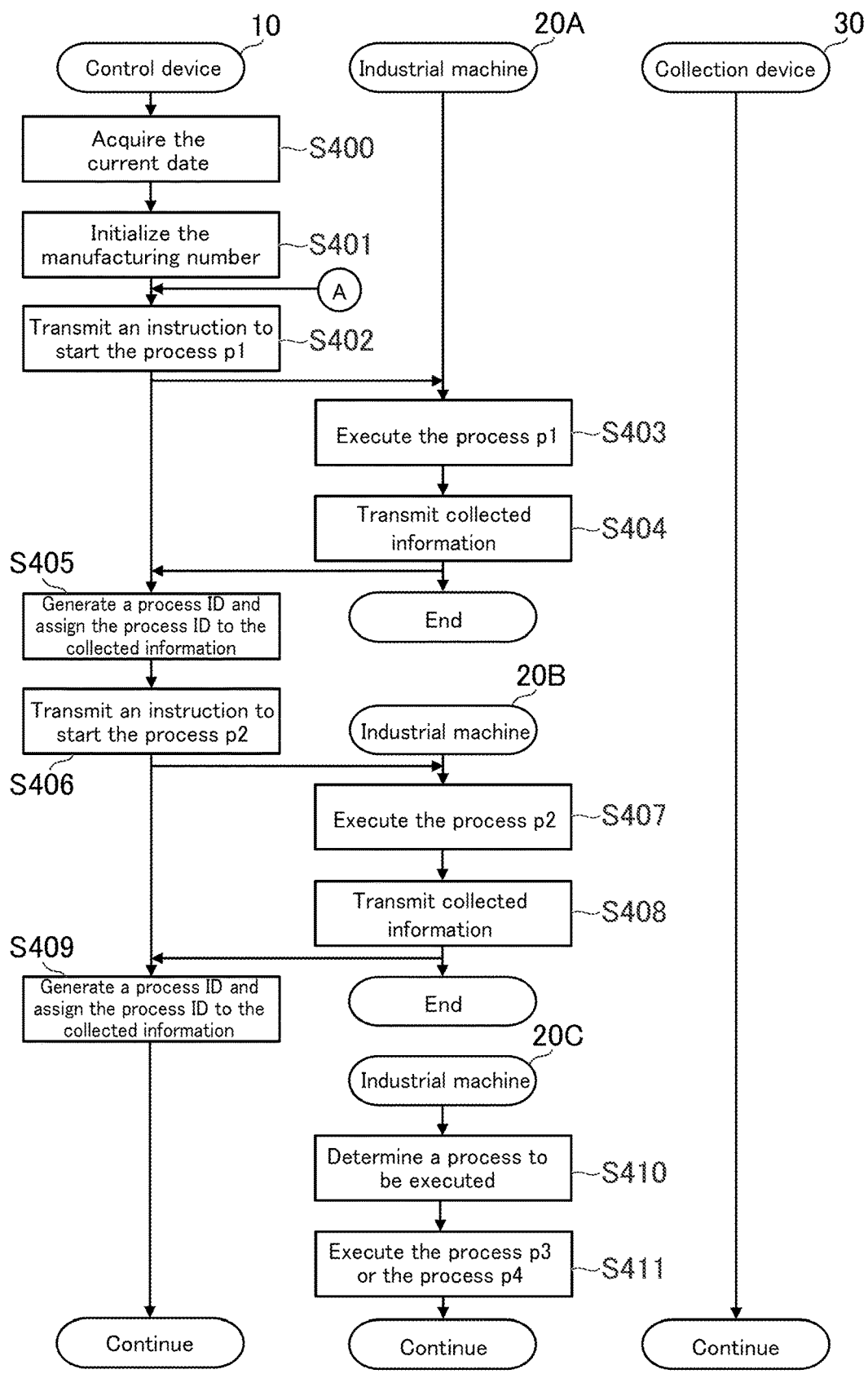
FIG. 17 is a flow diagram illustrating an example of processing executed by an information collection system of the fourth embodiment.
Figure 18:
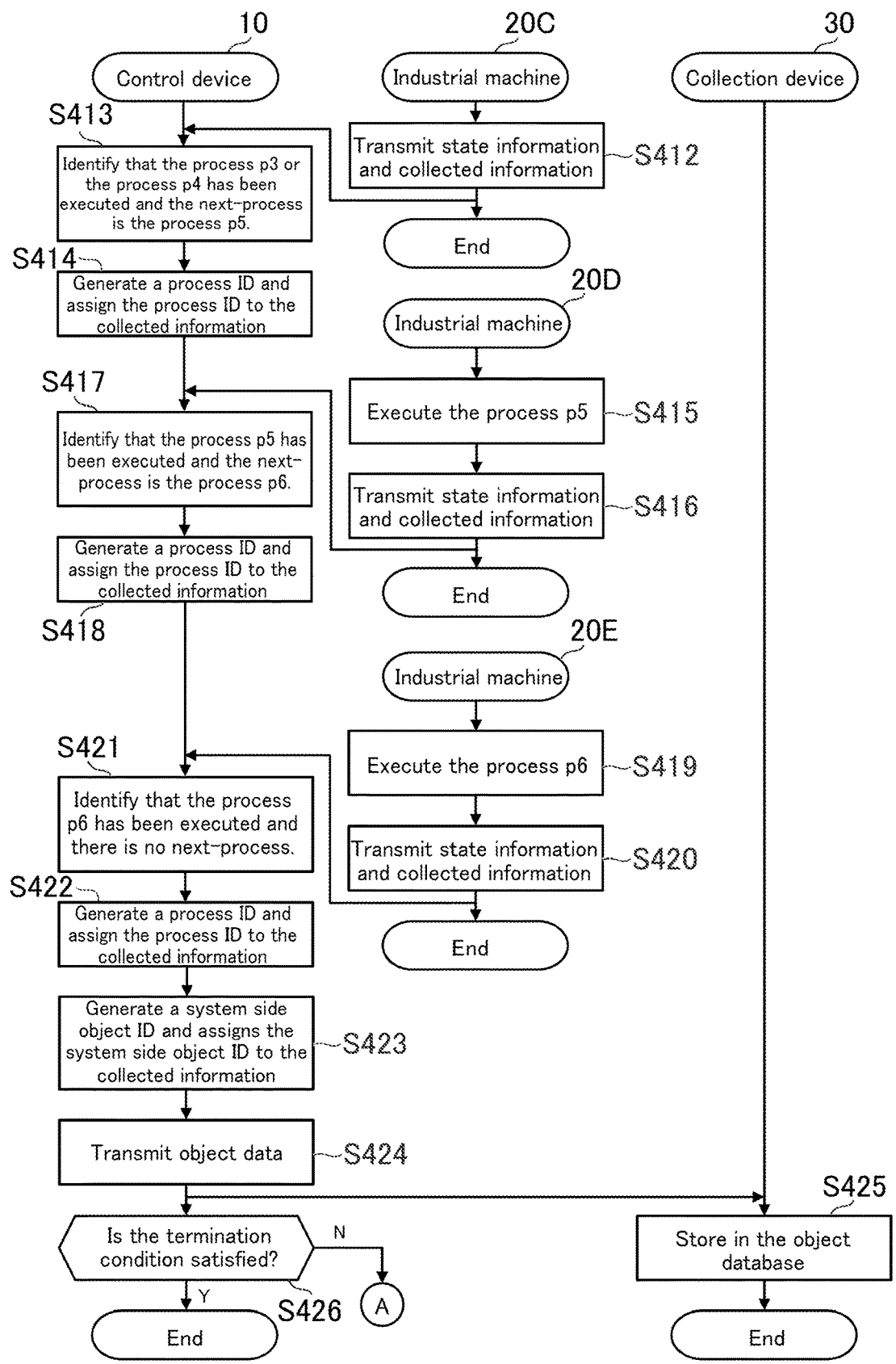
FIG. 18 is a flow diagram illustrating an example of processing executed by the information collection system of the fourth embodiment.

FIGS. 17 and 18 are flow diagrams illustrating an example of processing executed by the information collection system 1 of the fourth embodiment. Processing of S400-S401 is the same as the processing of S100-S101. The control device 10 determines whether or not an execution condition of the process (p1) is satisfied based on a control program, and when the execution condition is satisfied, the control device 10 transmits an instruction to start the process (p1) to the industrial machine (20A) (S402). Upon receiving the start instruction, the industrial machine (20A) executes the process (p1) (S403) and transmits collected information to the control device 10 (S404). Subsequent processing of S405 is the same as the processing of S108.

Subsequent processing of S406-S409 is the same as the processing of S402-S405, and the control device 10 causes the industrial machine (20B) to execute the process (p2). Subsequent processing of S410-S425 is the same as the processing of S311-S326. The control device 10 determines whether or not a termination condition is satisfied (S426). When it is determined that the termination condition is not satisfied (S426; N), the processing returns to S402 and a process with respect to a next object is started. When it is determined that the termination condition is satisfied (S426; Y), the present processing terminates.

According to the information collection system 1 of the fourth embodiment, even for a mixture of industrial machines 20 that are mainly controlled by the information collection system 1 and industrial machines 20 that are not mainly controlled by the information collection system 1, traceability can be ensured.

5. Modified Embodiments

The present invention is not limited to the embodiments described above. Appropriate modifications are possible within a scope without departing from the spirit of the present invention.

For example, when an object can be identified by only a combination of process IDs, it is not necessary to generate an object ID. Further, for example, in the information collection system 1, it is also possible that only inspection or measurement of a finished product is executed as a process without machining or the like. Further, for example, it is not necessary for a process branching to occur. Further, for example, when a process branching occurs, a process branching may further occur after that. Further, for example, it is also possible that the object data (D1) does not include an object ID, and an object is identified by a process ID.

Further, for example, the functions described above may each be realized by any device in the information collection system 1. For example, a function described as being realized by the collection device 30 may be realized by the control device 10 or the industrial machines 20. Further, for example, a function described as being realized by the control device 10 may be realized by the collection device 30 or the industrial machines 20. Further, for example, it is also possible that the realization of the functions is not shared by multiple devices, but is performed by one device.

An information collection system according to one aspect of the present invention includes: an industrial machine communication part that communicates with one or more industrial machines that execute predetermined one or more processes with respect to an object; an identification part that identifies, based on predetermined information received from the one or more industrial machines, the one or more processes executed with respect to the object; and an assigning part that assigns process identification information related to the one or more processes to collected information related to the object collected from the one or more industrial machines.

According to an embodiment of the present invention, for example, traceability with respect to an object is ensured based on information received from one or more industrial machines.

Obviously, numerous modifications and variations of the present invention are possible in light of the above teachings. It is therefore to be understood that within the scope of the appended claims, the invention may be practiced otherwise than as specifically described herein.

What is claimed is:

1. An information collection system for industrial machines, comprising:
processing circuitry configured to
communicate with one or more industrial machines that execute one or more predetermined processes with respect to an object,
identify, based on predetermined information received from the one or more industrial machines, the one or more predetermined processes executed with respect to the object, and
assign process identification information related to the one or more predetermined processes to collected information related to the object collected from the one or more industrial machines, the process identification information of a same process executed with respect to a first object and a second object and assigned to the collected information of the first object being different from second process identification information of the same process assigned to second collected information of the second object.

2. The information collection system according to claim 1, wherein the predetermined information includes object identification information of the object generated on the one or more industrial machines, and the processing circuitry is further configured to identify the one or more predetermined processes executed with respect to the object corresponding to the object identification information received from the one or more industrial machines.

3. The information collection system according to claim 2, wherein the processing circuitry is further configured to generate second object identification information that is different from the object identification information generated on the one or more industrial machines, and further assign the second object identification information to the collected information.

4. The information collection system according to claim 3, wherein the predetermined information is process information related to at least one of a next-process and a pre-process generated for each of the one or more predetermined processes on the one or more industrial machines, and the processing circuitry is further configured to identify the one or more predetermined processes executed with respect to the object based on the process information received from the one or more industrial machines for each of the one or more predetermined processes.

5. The information collection system according to claim 3, wherein the predetermined information is state information related to a state of the object and transmitted for each of the one or more predetermined processes by the one or more industrial machines, and the processing circuitry is further configured to identify the one or more predetermined processes executed with respect to the object based on the state information received from the one or more industrial machines for each of the one or more predetermined processes.

6. The information collection system according to claim 1, wherein the predetermined information is process information related to at least one of a next-process and a pre-process generated for each of the one or more predetermined processes on the one or more industrial machines, and the processing circuitry is further configured to identify the one or more predetermined processes executed with respect to the object based on the process information received from the one or more industrial machines for each of the one or more predetermined processes.

7. The information collection system according to claim 6, wherein the predetermined information is state information related to a state of the object and transmitted for each of the one or more predetermined processes by the one or more industrial machines, and the processing circuitry is further configured to identify the one or more predetermined processes executed with respect to the object based on the state information received from the one or more industrial machines for each of the one or more predetermined processes.

8. The information collection system according to claim 2, wherein the predetermined information is process information related to at least one of a next-process and a pre-process generated for each of the one or more predetermined processes on the one or more industrial machines, and the processing circuitry is further configured to identify the one or more predetermined processes executed with respect to the object based on the process information received from the one or more industrial machines for each of the one or more predetermined processes.

9. The information collection system according to claim 2, wherein the predetermined information is state information related to a state of the object and transmitted for each of the one or more predetermined processes by the one or more industrial machines, and the processing circuitry is further configured to identify the one or more predetermined processes executed with respect to the object based on the state information received from the one or more industrial machines for each of the one or more predetermined processes.

10. The information collection system according to claim 2, wherein the one or more industrial machines comprise a plurality of industrial machines and the processing circuitry is further configured to communicate with each of the industrial machines, control a group of the industrial machines, identify the one or more predetermined processes executed with respect to the object based on a control content of the processing circuitry for the group of the industrial machines, identify the one or more predetermined processes executed with respect to the object based on the predetermined information for a second group of industrial machines, and assign the process identification information related to the one or more predetermined processes executed by the group of the industrial machines and the second group of industrial machines to the collected information.

11. The information collection system according to claim 1, wherein the predetermined information is state information related to a state of the object and transmitted for each of the one or more predetermined processes by the one or more industrial machines, and the processing circuitry is further configured to identify the one or more predetermined processes executed with respect to the object based on the state information received from the one or more industrial machines for each of the one or more predetermined processes.

12. The information collection system according to claim 1, wherein the one or more industrial machines comprise a plurality of industrial machines and the processing circuitry is further configured to communicate with each of the industrial machines, control a group of the industrial machines, identify the one or more predetermined processes executed with respect to the object based on a control content of the processing circuitry for the group of the industrial machines, identify the one or more predetermined processes executed with respect to the object based on the predetermined information for a second group of industrial machines, and assign the process identification information related to the one or more predetermined processes executed by the group of the industrial machines and the second group of industrial machines to the collected information.

13. The information collection system according to claim 1, further comprising:
a storage configured to store, in a database, the collected information to which the process identification information related to the one or more predetermined processes is assigned.

14. The information collection system according to claim 1, wherein the processing circuitry is further configured to assign the process identification information related to the one or more predetermined processes to the collected information collected for each of the one or more predetermined processes from the one or more industrial machines.

15. The information collection system according to claim 1, wherein the one or more predetermined processes have a plurality of routes that are executable with respect to the object, the one or more industrial machines execute the one or more predetermined processes of one of the routes with respect to the object, and the process identification information related to the one or more predetermined processes is information that identifies the routes.

16. The information collection system according to claim 1, wherein the processing circuitry is further configured to identify which one of a plurality of processes executable by a single industrial machine among the one or more industrial machines has been executed.

17. The information collection system according to claim 1, wherein the processing circuitry is further configured to generate object identification information of the object and assign the generated object identification information to the collected information.

18. An information collection method, comprising:
communicating with one or more industrial machines that execute one or more predetermined processes with respect to an object;
identifying the one or more predetermined processes executed with respect to the object based on predetermined information received from the one or more industrial machines; and
assigning process identification information related to the one or more predetermined processes to collected information related to the object collected from the one or more industrial machines, the process identification information of a same process executed with respect to a first object and a second object and assigned to the collected information of the first object being different from second process identification information of the same process assigned to second collected information of the second object.

19. A non-transitory computer readable medium having stored thereon a program that when executed by a computer causes the computer to implement an information collection method comprising:
communicating with one or more industrial machines that execute one or more predetermined processes with respect to an object;

identifying the one or more predetermined processes executed with respect to the object based on predetermined information received from the one or more industrial machines; and assigning process identification information related to the one or more predetermined processes to collected information related to the object collected from the one or more industrial machines, the process identification information of a same process executed with respect to a first object and a second object and assigned to the collected information of the first object being different from second process identification information of the same process assigned to second collected information of the second object.

* * * * *